US010492033B1

(12) United States Patent
Kim

(10) Patent No.: US 10,492,033 B1
(45) Date of Patent: Nov. 26, 2019

(54) TERMINAL FOR TRACKING LOCATION OF ARTICLE SET BY INDIVIDUAL, AND LOCATION TRACKING SYSTEM AND METHOD USING TERMINAL FOR TRACKING LOCATION OF ARTICLE SET BY INDIVIDUAL

(71) Applicant: Kyungwon Kim, Ansan-si (KR)

(72) Inventor: Kyungwon Kim, Ansan-si (KR)

( * ) Notice: Subject to any disclaimer, the term of this patent is extended or adjusted under 35 U.S.C. 154(b) by 0 days.

(21) Appl. No.: 16/524,013

(22) Filed: Jul. 27, 2019

(30) Foreign Application Priority Data

Oct. 10, 2018 (KR) .......................... 10-2018-0120295

(51) Int. Cl.
*G06K 7/10* (2006.01)
*H04W 4/029* (2018.01)
*G08B 21/24* (2006.01)

(52) U.S. Cl.
CPC ............ *H04W 4/029* (2018.02); *G08B 21/24* (2013.01)

(58) Field of Classification Search
CPC ..... H04W 4/023; H04W 12/06; H04W 4/008; H04W 4/028; H04W 4/029; G08B 21/24; G06K 7/10366; G06Q 10/087; G07C 9/00896
See application file for complete search history.

(56) References Cited

U.S. PATENT DOCUMENTS

| 5,745,037 A * | 4/1998 | Guthrie .................. G08B 21/22 340/10.2 |
| 6,933,849 B2 * | 8/2005 | Sawyer ................... G01S 7/003 340/572.4 |
| 7,671,718 B2 * | 3/2010 | Turner ............... G07C 9/00087 340/10.1 |
| 9,740,897 B1 * | 8/2017 | Salour ............... G06K 7/10316 |
| 9,836,936 B1 * | 12/2017 | Brown ................ G06Q 10/087 |
| 2005/0137943 A1 * | 6/2005 | Holzman ............. G06Q 10/087 705/28 |
| 2005/0190098 A1 * | 9/2005 | Bridgelall ............... G01S 13/32 342/118 |

(Continued)

FOREIGN PATENT DOCUMENTS

| KR | 10-1104815 B1 | 1/2012 |
| KR | 10-2012-0021029 A | 3/2012 |
| KR | 10-2013-0061470 A | 6/2013 |

*Primary Examiner* — An T Nguyen
(74) *Attorney, Agent, or Firm* — Korus Patent, LLC; Seong Il Jeong

(57) ABSTRACT

Disclosed herein are a terminal for tracking the location of an article set by an individual and a location tracking system and method using the terminal. The terminal includes a possession location tracking terminal (100), including: an information input unit (110) to which information required for the selection of an identifier (ID) of one of possession tags (200) provided in possessions possessed by a possessor and a request for tracking of the location of a possession tag (200) provided in a corresponding possession having the tag ID is input; an information output unit (120) which has a liquid crystal display (121); an information storage unit (130) in which per-tag ID information is stored; an information communication unit (140) which performs a communication interface function of transmitting the information; and a control unit (150) which performs control such that the information is input, output, and transmitted.

13 Claims, 11 Drawing Sheets

(56) References Cited

U.S. PATENT DOCUMENTS

| | | | |
|---|---|---|---|
| 2006/0072787 A1* | 4/2006 | Claudatos | G06Q 10/087 382/103 |
| 2008/0122626 A1* | 5/2008 | Ehrman | G06Q 10/08 340/572.1 |
| 2010/0052867 A1* | 3/2010 | Kwok | G01V 15/00 340/10.42 |
| 2010/0156651 A1* | 6/2010 | Broer | G01S 13/74 340/670 |
| 2012/0161967 A1* | 6/2012 | Stern | G06Q 10/087 340/572.1 |
| 2014/0002239 A1* | 1/2014 | Rayner | G08B 13/1427 340/5.61 |
| 2014/0084060 A1* | 3/2014 | Jain | G06Q 10/087 235/385 |
| 2014/0240088 A1* | 8/2014 | Robinette | G08B 13/1427 340/5.61 |
| 2014/0351098 A1* | 11/2014 | Shafer | G06Q 10/087 705/28 |
| 2016/0050530 A1* | 2/2016 | Corbalis | H04W 4/029 455/456.1 |
| 2017/0061175 A1* | 3/2017 | Lee | G06K 7/10366 |

* cited by examiner

TERMINAL FOR TRACKING LOCATION OF ARTICLE SET BY INDIVIDUAL, AND LOCATION TRACKING SYSTEM AND METHOD USING TERMINAL FOR TRACKING LOCATION OF ARTICLE SET BY INDIVIDUAL

CROSS-REFERENCE TO RELATED APPLICATION

This application claims the benefit of Korean Patent Application No. 10-2018-0120295 filed on Oct. 10, 2018, which is hereby incorporated by reference herein in its entirety.

BACKGROUND

1. Technical Field

The present invention relates to a terminal for tracking the location of an article set by an individual, which individually identifies a plurality of possessions possessed by a possessor, tracks the location of a specific possession designated by the possessor among the plurality of possessions possessed by the possessor, performs control such that a message providing guidance on the location of the tracking target possession is selectively output via a user-selected one of a tag provided in the corresponding possession and a location tracking terminal held by the possessor depending on whether the possession is classified as valuable according to the intention of the possessor among the possessions possessed by the possessor, and allows the detection distance between the location tracking terminal and the tag provided in the tracking target possession to be adjusted when the terminal is selected as a device which provides guidance on the location of the tracking target possession, and also relates to a location tracking system and method using the terminal for tracking the location of an article set by an individual.

2. Description of the Related Art

In Korea, hundreds of thousands of possessions, such as bags or clothes, are lost due to the carelessness and insufficient management of possessors, but the recovery rate thereof is extremely low.

For example, in the period from November of 2008 to December of 2009, a total of 23,389 cases were registered for city and village buses and corporation and private taxis except for railway lines in the "Integrated Lost and Found Center for Public Transportation" operated by the Seoul Metropolitan Government.

Meanwhile, such losses are occurring not only in public transportation but also in public places such as schools, libraries, parks, restaurants, theaters, and amusement facilities. However, it is extremely rare for possessors to recover them.

In addition, in the case of a house where a possessor resides, if a possessor cannot remember where to deposit or store a variety of possessions, such as a smartphone, a watch, a TV remote control, an air conditioner remote control, bankbooks, credit cards, important documents, a personal seal, a wallet, and valuables such as gold and silver, it takes a lot of time to find the possessions.

Meanwhile, currently, a person who finds or acquires a lost item cannot know information about the follow-up management of the acquired item after he or she has left his or her acquired item to a nearby police box or collection center. Furthermore, when a possessor who recovers his or her lost item wants to make appropriate compensation to a person who found the item, there are cases where the compensation cannot be made because the contact information of the person who found the item is not recorded.

Accordingly, there has been a need for a method and system for managing lost and found item information through a network which enables information about lost and found items to be efficiently managed through a communication network, such as the Internet, and also enables the report and registration of found items and the recovery of lost items to be rapidly and accurately performed. In order to overcome these problems, various products have been commercialized.

As an example thereof, there has been proposed a method using a receiver configured to be attached to a possession and an app configured to be installed on a smartphone and to track the receiver attached to the possession.

However, this method is problematic in that a pairing error is serious depending on distance during the use of Bluetooth and the consumption of the battery of the smartphone is high.

The above problems have been overcome by a method of operating a terminal for preventing a lost item, which was previously registered by the present applicant (see Korean Patent No. 10-1533538).

In the conventional method of operating a terminal for preventing a lost item, receivers are attached to respective articles desired by an owner, the distance between each of the articles, to which the receivers have been attached, and an operation device is determined in real time by using the operation device, which is a dedicated terminal having low battery consumption and supporting easy battery replacement, as a management terminal, and also a pairing procedure is also considerably convenient.

However, in spite of these advantages, the conventional method of operating a terminal for preventing a lost item has the following problems.

That is, the conventional method does not provide a method that in case of possessions which are articles possessed by a possessor, can individually identify various possessions, such as a smartphone, a watch, a TV remote control, an air conditioner remote control, bankbooks, credit cards, important documents, a personal seal, a wallet, etc., and can track the location of a specific tracking target possession desired by the possessor.

SUMMARY

The present invention has been conceived to overcome the above-described problems, and an object of the present invention is to provide a terminal for tracking the location of an article set by an individual, which individually identifies a plurality of possessions possessed by a possessor and tracks the location of a specific possession designated by the possessor among the plurality of possessions possessed by the possessor and also to provide a location tracking system and method using the terminal for tracking the location of an article set by an individual.

In order to accomplish the above object, the present invention provides a terminal for tracking the location of an article set by an individual, the terminal including a possession location tracking terminal, the possession location tracking terminal including: an information input unit to which information required for the selection of an identifier (ID) of one of possession tags provided in possessions possessed by a possessor and a request for the tracking of the location of a possession tag provided in a corresponding possession having the tag ID is input; an information output unit which has a liquid crystal display on which the information required for the selection of the ID of one of the possession tags provided in the possessions possessed by the possessor is displayed; an information storage unit in which per-tag ID information which is the IDs of the possession tags provided in the possessions possessed by the possessor is stored; an information communication unit which performs the communication interface function of transmitting the information required for the request for the tracking of the location of the tracking target possession tag of the possession tags provided in the possessions possessed by the possessor; and a control unit which performs control such that the information required for the selection of the ID of one of possession tags provided in the possessions possessed by the possessor and the request for the tracking of the location of the possession tag provided in the corresponding possession having the tag ID is input, output, and transmitted.

A tag guidance mode in which when the designated one of the possession tags of the possessions possessed by the possessor is detected through the tracking of the location of the designated possession tag, the designated possession tag provides guidance on its own location may be provided as a mode in which the operation method of the control unit is set; and the control unit, when detecting the designated one of the possession tags of the possessions possessed by the possessor in the tag guidance mode through the tracking of the location of the designated possession tag, may perform control such that a tag output signal requesting the designated possession tag to provide guidance on its own location is generated.

A main body guidance mode in which when the designated one of the possession tags of the possessions possessed by the possessor is detected through the tracking of the location of the designated possession tag, the possession location tracking terminal outputs information about the detection of the designated possession tag may be provided as a mode in which the operation method of the control unit is set; and the control unit, when detecting the specific one of the possession tags of the possessions possessed by the possessor in the main body guidance mode through the tracking of the location of the designated possession tag, may perform control such that the information about the detection of the designated possession tag is output via the information output unit.

The information storage unit may store per-received signal strength distance information which is indicative of distances from the possession location tracking terminal having received per-tag ID signals from the possession tags based on the detected signal strengths of the received per-tag ID signals so that the distances between the possession tags and the possession location tracking terminal are determined, and user-designated detection distance information which is information designated by a user and which is indicative of a set distance over which the possession location tracking terminal can detect the possession tag during the tracking of the location; and the control unit, when receiving a per-tag ID signal from one of the possession tags in the main body guidance mode, may become aware of the corresponding possession tag by reference to the received corresponding per-tag ID signal, may detect the signal strength of the received per-tag ID signal, may determine a detection distance between the possession location tracking terminal and the possession tag by matching the detected signal strength of the per-tag ID signal against the per-received signal strength distance information stored in the information storage unit, and, when the detection distance corresponds to the user-designated detection distance information stored in the information storage unit, may perform the function of performing control such that the information about the detection of the designated possession tag is output via the information output unit.

According to a first embodiment of the present invention, there is provided a location tracking system using a terminal for tracking a location of an article set by an individual, the location tracking system including: possession tags which are provided in respective possessions possessed by a possessor, transmit per-tag ID signals, including tag ID information used to identify the corresponding tags, at preset intervals, and are equipped with respective buzzers; and a possession location tracking terminal which, when per-tag ID signals are received from the possession tags, checks whether a per-tag ID signal of a tracking target tag of the possession tags provided in the possessions possessed by the possessor is present, and generates and transmits a tag output signal, including the tag ID information of the corresponding possession tag, as a signal requesting the corresponding possession tag to provide guidance on a location; wherein the tracking target possession tag receives the tag output signal and performs control such that output sound is issued via a buzzer when the tag ID information included in the transmitted tag output signal is the same as its own tag ID information.

There is provided a location tracking method using the terminal for tracking a location of an article set by an individual according to the first embodiment, the location tracking method including: registering possession tags provided in possessions possessed by a possessor in a possession location tracking terminal; becoming aware of, by the possession location tracking terminal, a tracking target possession tag of the possession tags provided in the possessions possessed by the possessor; transmitting, by the possession tags, per-tag ID signals, including tag ID information used to identify the corresponding tags, at preset intervals; checking, by the possession location tracking terminal, whether the per-tag ID signal of the tracking target possession tag of the possession tags provided in the possessions possessed by the possessor is present when per-tag ID signals are received from the possession tags; when the per-tag ID signal of the tracking target tag of the possession tags provided in the possessions possessed by the possessor is present, generating and transmitting, by the possession location tracking terminal, a tag output signal, including the tag ID information of the corresponding possession tag, as a signal requesting the corresponding possession tag to provide guidance on a location; and receiving, by the tracking target possession tag, the tag output signal, and performing, by the tracking target possession tag, control such that output sound is issued via a buzzer when the tag ID information included in the transmitted tag output signal is the same as its own tag ID information.

According to a second embodiment of the present invention, there is provided a location tracking system using a terminal for tracking a location of an article set by an individual, the location tracking system including: possession tags which are provided in respective possessions possessed by a possessor and transmit per-tag ID signals including tag ID information used to identify the corresponding tags; and a possession location tracking terminal which, when per-tag ID signals are received from the possession tags, checks whether a per-tag ID signal of a tracking target tag of the possession tags provided in the possessions possessed by the possessor is present and provides guidance such that information about the detection of the tracking target possession tag is output when the per-tag ID signal of the tracking target tag is present.

There is provided a location tracking method using the terminal for tracking a location of an article set by an individual according to the second embodiment, the location tracking method including: registering possession tags provided in possessions possessed by a possessor in a possession location tracking terminal; becoming aware of, by the possession location tracking terminal, a tracking target possession tag of the possession tags provided in the possessions possessed by the possessor; transmitting, by the possession tags, per-tag ID signals including tag ID information used to identify the corresponding tags; checking, by the possession location tracking terminal, whether the per-tag ID signal of the tracking target possession tag of the possession tags provided in the possessions possessed by the possessor is present when per-tag ID signals are received from the possession tags; and, when the per-tag ID signal of the tracking target tag of the possession tags provided in the possessions possessed by the possessor is present, performing, by the possession location tracking terminal, control such that information about the detection of the tracking target possession tag is output.

When the per-tag ID signal of the tracking target possession tag of the possession tags provided in the possessions possessed by the possessor is present, performing, by the possession location tracking terminal, control such that information about the detection of the tracking target possession tag is output may include: becoming aware of, by the possession location tracking terminal, a corresponding possession tag by reference to the received corresponding per-tag ID signal when a per-tag ID signal is received from one of the possession tags; transmitting, by the possession tags, per-tag ID signals, including tag ID information used to identify the corresponding tags; detecting, by the possession location tracking terminal, the signal strength of the received per-tag ID signal; determining, by the possession location tracking terminal, the detection distance between the possession location tracking terminal and the tracking target possession tag by matching the detected signal strength of the per-tag ID signal against preset per-received signal strength distance information; checking, by the possession location tracking terminal, whether the determined detection distance corresponds to predetermined user-designated detection distance information; and, when the determined detection distance corresponds to the predetermined user-designated detection distance information in the main body guidance mode, performing, by the possession location tracking terminal, control such that information about the detection of the tracking target possession tag is output.

According to a third embodiment of the present invention, there is provided a location tracking system using a terminal for tracking a location of an article set by an individual, the location tracking system including: a possession location tracking terminal which includes a control unit configured to perform control such that information required for the selection of the ID of one of possession tags provided in possessions possessed by a possessor and a request for the tracking of the location of a possession tag provided in a corresponding possession having the tag ID is input, output and transmitted; and possession tags which are provided in respective possessions possessed by a possessor, transmit per-tag ID signals, including tag ID information used to identify the corresponding tags, at preset intervals, and are equipped with respective buzzers; wherein the possession location tracking terminal controls the control unit such that a tag output signal requesting the designated possession tag to provide guidance on its own location is generated when detecting the designated one of the possession tags of the possessions possessed by the possessor through the tracking of the location of designated possession tag in the case where a mode in which the operation method of the control unit is set is a tag guidance mode in which when the designated one of the possession tags of the possessions possessed by the possessor is detected through the tracking of the location of the designated possession tag, the designated possession tag provides guidance on its own location, and also controls the control unit such that information about the detection of the specific possession tag is output via an information output unit when detecting the specific one of the possession tags of the possessions possessed by the possessor in the main body guidance mode through the tracking of the location of the designated possession tag in the case where a mode in which the operation method of the control unit is set is a main body guidance mode in which when the designated one of the possession tags of the possessions possessed by the possessor is detected through the tracking of the location of the designated possession tag, the possession location tracking terminal outputs information about the detection of the designated possession tag.

There is provided a location tracking method using the terminal for tracking a location of an article set by an individual according to the third embodiment, the location tracking method including: registering possession tags provided in possessions possessed by a possessor in a possession location tracking terminal; becoming aware of, by the possession location tracking terminal, a tracking target possession tag of the possession tags provided in the possessions possessed by the possessor; transmitting, by the possession tags, per-tag ID signals, including tag ID information used to identify the corresponding tags; determining, by the possession location tracking terminal, which of a tag guidance mode and a main body guidance mode is a set mode; when the set mode is a tag guidance mode, controlling, by the possession location tracking terminal, the control unit so that the control unit checks whether the per-tag ID signal of the tracking target possession tag of the possession tags provided in the possessions possessed by the possessor is present when per-tag ID signals are received from the possession tags; when the per-tag ID signal of the tracking target tag of the possession tags provided in the possessions possessed by the possessor is present in the tag guidance mode, generating and transmitting, by the control unit of the possession location tracking terminal, a tag output signal, including the tag ID information of the corresponding possession tag, as a signal requesting the corresponding possession tag to provide guidance on a location; and receiving, by the tracking target possession tag, the tag output signal, and performing, by the tracking target possession tag, control such that output sound is issued via a buzzer when the tag ID information included in the transmitted tag output signal is the same as its own tag ID information.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
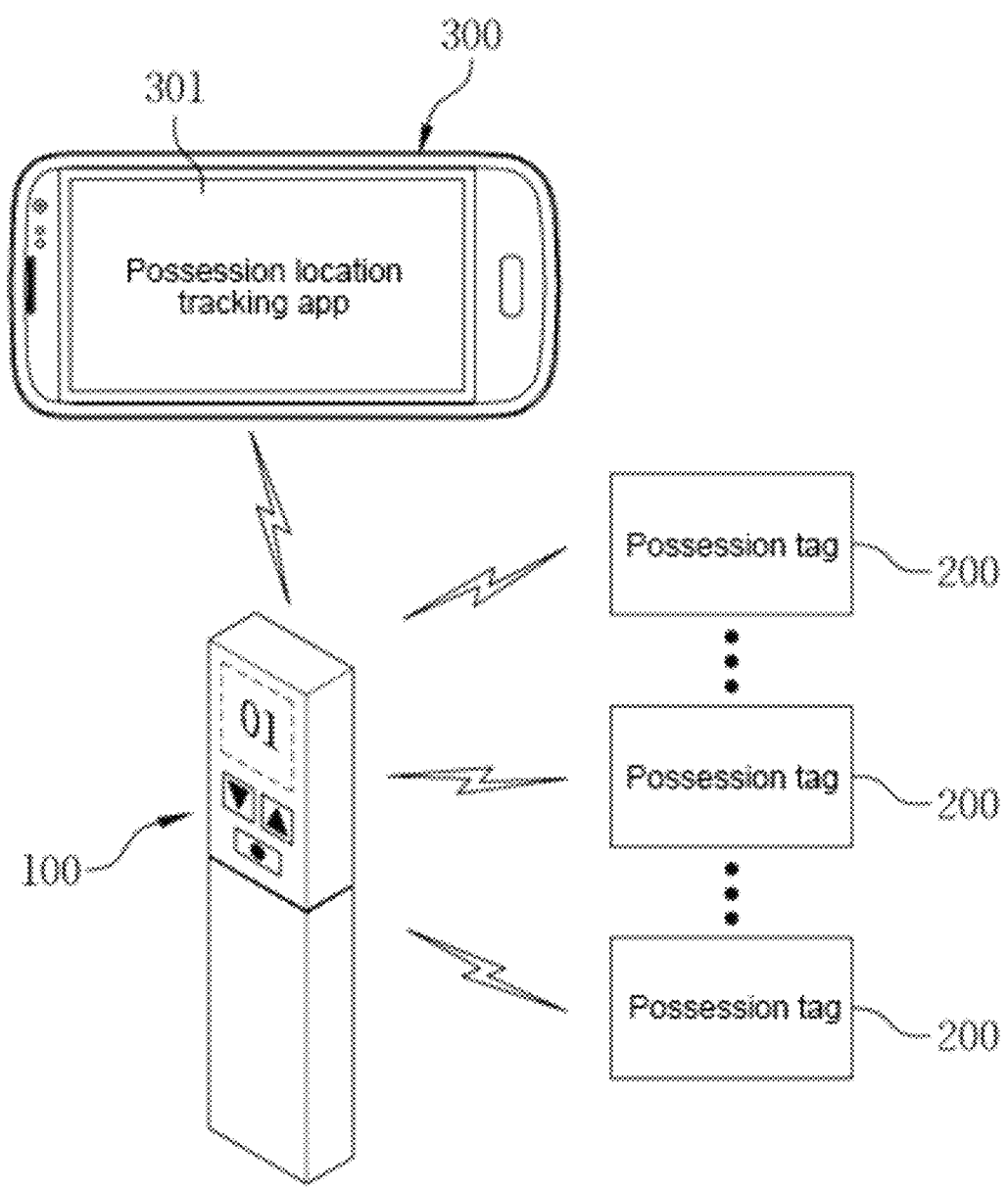
FIG. 1 is a view showing the overall configuration of a location tracking system using a terminal for tracking the location of an article set by an individual according to the present invention.
Figure 2:
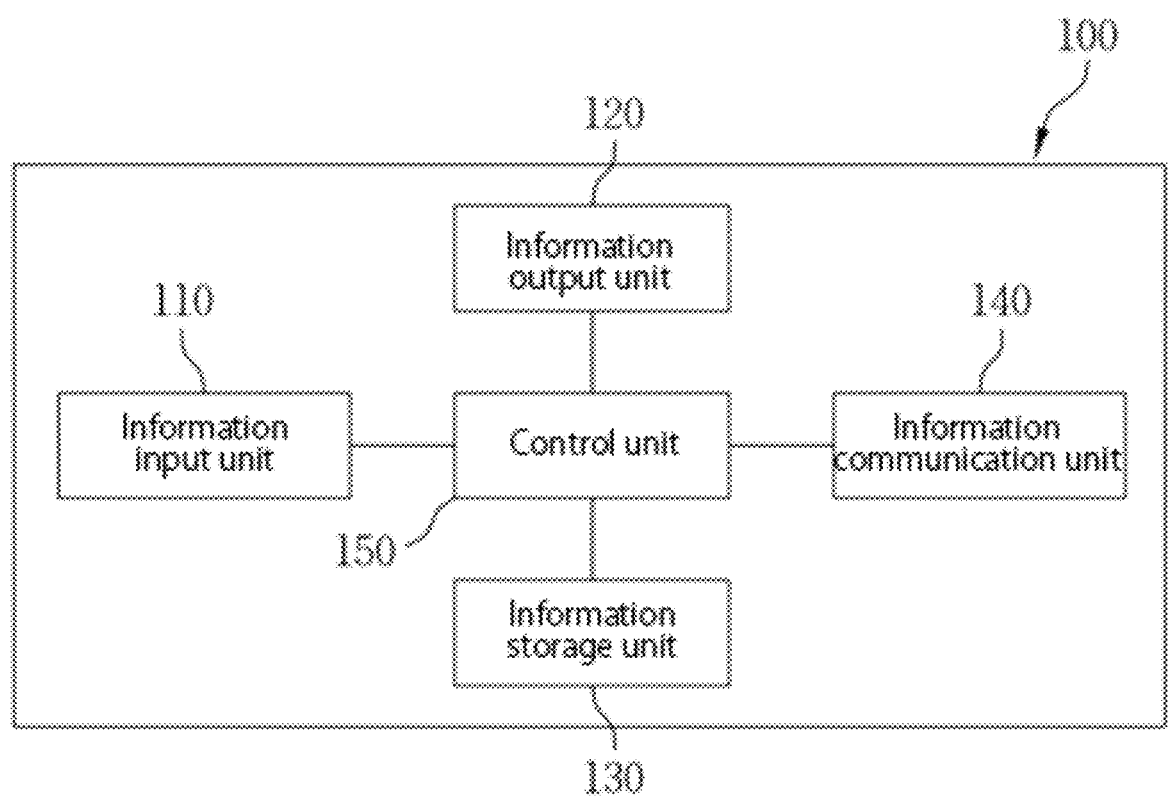
FIG. 2 is a block diagram showing the terminal for tracking the location of an article set by an individual according to the present invention.
Figure 3:
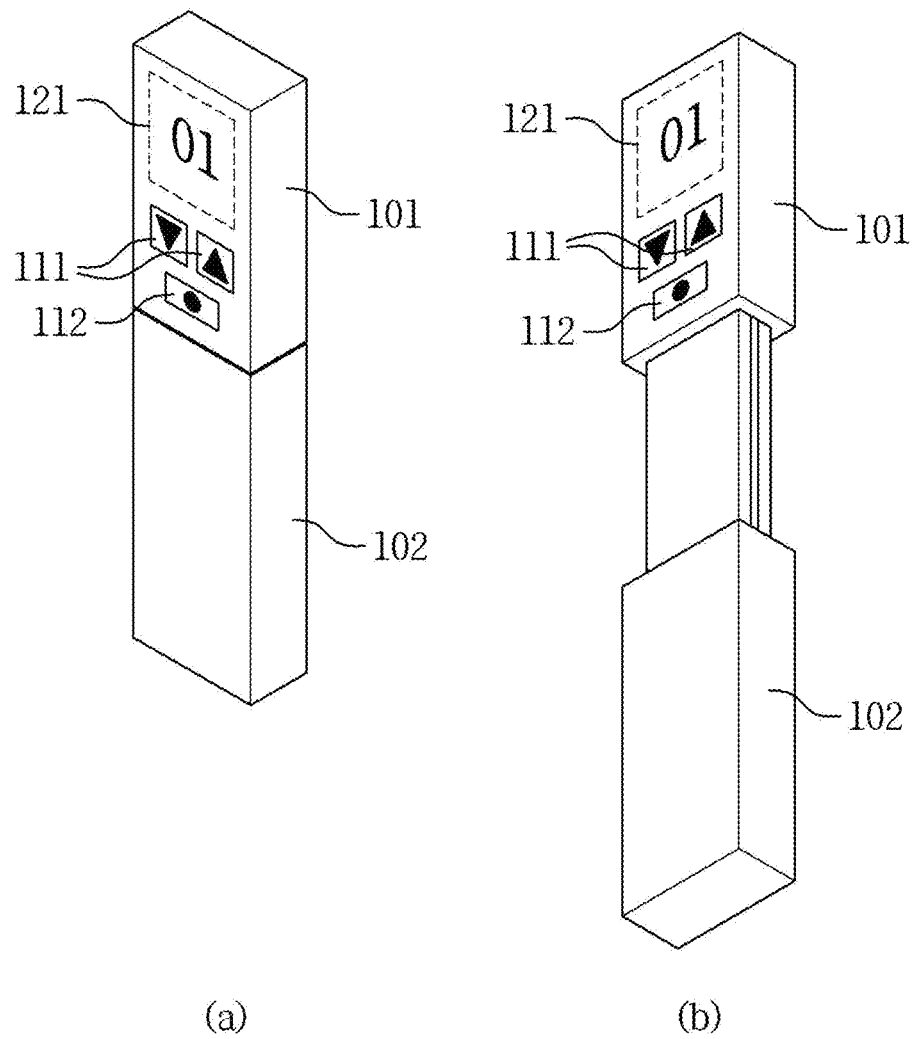
FIG. 3 is a perspective view showing the appearance of the terminal for tracking the location of an article set by an individual according to the present invention.
Figure 4:
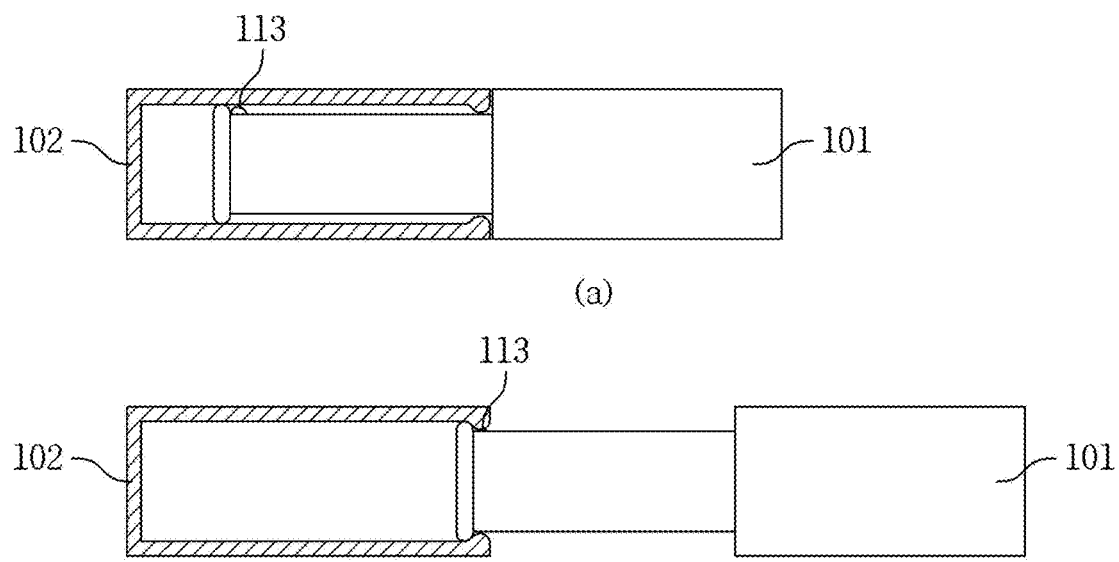
FIG. 4 is a sectional view showing the appearance of the terminal for tracking the location of an article set by an individual according to the present invention.
Figure 5:
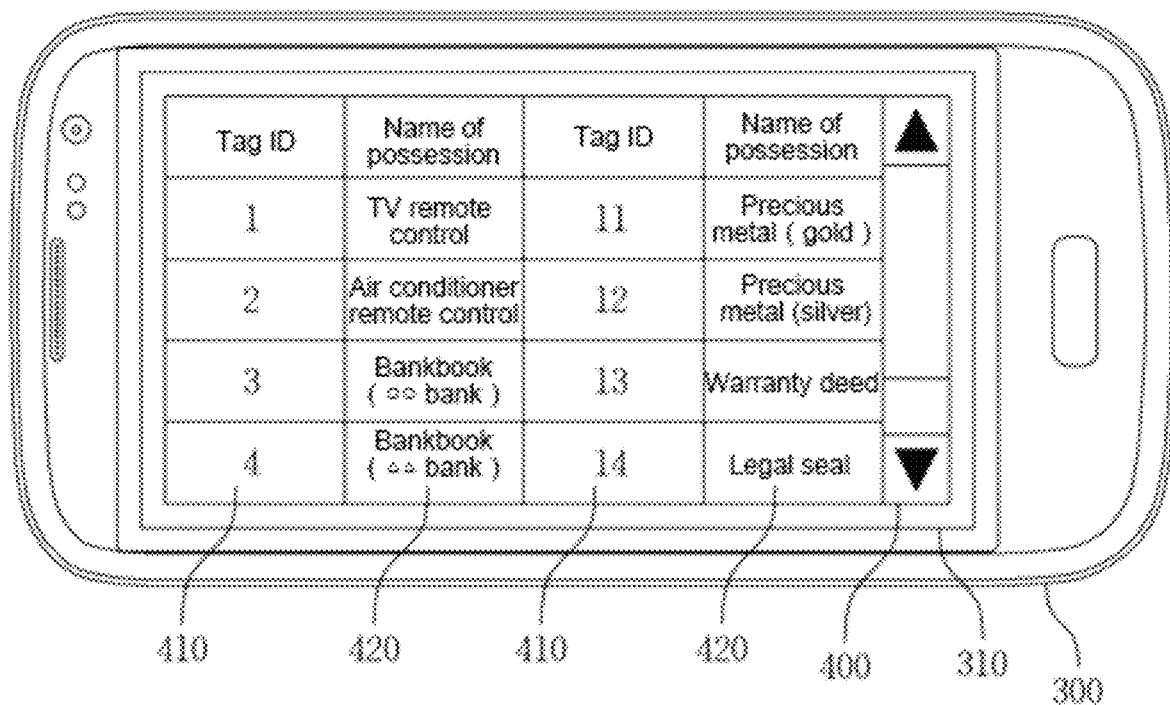
FIG. 5 is a view showing a per-tag possession detection guidance screen which is output via the information output unit of the terminal for tracking the location of an article set by an individual according to the present invention.

Prior to describing the configurations of and operations of embodiments of the present invention with reference to the accompanying drawings in detail, it should be noted that the present invention may be subjected to various modifications and have various forms, the following embodiments are intended to describe the present invention in detail but are not intended to limit the present invention to specific forms, and all modifications, equivalents, and substitutes included in the spirit and technical scope of the present invention are encompassed within the present invention.

Furthermore, although the sizes or thicknesses of components are exaggerated or simplified for the sake of ease of understanding or the like in the drawings, the scope of the present invention should not be interpreted as being limited by the exaggeration or simplification. In the case where components perform the same functions, the same reference symbols are assigned to the components.

Moreover, the terms used herein are used merely to illustrate the following embodiments, but are not intended to limit the present invention. A singular expression includes a plural expression, unless clearly expressed otherwise in the context.

As shown in the drawings, a terminal for tracking the location of an article set by an individual according to the present invention is a terminal which individually identifies a plurality of possessions possessed by a possessor and tracks the location of a specific possession designated by the possessor among the plurality of possessions possessed by the possessor.

A possession location tracking terminal 100, which is the terminal for tracking the location of an article set by an individual according to the present invention which performs the above-described function, includes an information input unit 110, an information output unit 120, an information storage unit 130, an information communication unit 140, and a control unit 150.

First, the information input unit 110 is a component to which information required for the selection of the ID of one of possession tags 200 provided in respective possessions possessed by a possessor and a request for the tracking of the location of a possession tag 200 provided in a corresponding possession having the tag ID is input.

The information input unit 110 which performs the above-described function may be a combination of a keypad including buttons, a dome switch, a touchpad (static pressure/electrostatic), a jog wheel, a jog switch, and the like. In the present embodiment of the present invention, a description will be given with the keypad including buttons applied as the information input unit 110.

In other words, the information input unit 110, as which the keypad is applied, provides tag ID selection buttons 111 which select an ID from among the IDs of the possession tags 200 of the possessions possessed by the possessor and a location tracking request button 112 which requests the tracking of the location of the possession tag 200 provided in the corresponding possession having the selected tag ID.

The information output unit 120 is a component which displays information required for the selection of one from among the IDs of the possession tags 200 provided in the possessions possessed by the possessor.

The information output unit 120 which performs the above-described function may be a buzzer, a speaker, or a display unit.

Meanwhile, various output components, such as a flexible numeric display (FND) having 2 to 7 segments, a liquid crystal display (LCD) 121, a thin film transistor liquid crystal display (TFT LCD), an organic light-emitting diode (OLED) display, a flexible display, and a 3D display, may be selectively applied as the display unit. In the present embodiment of the present invention, a description will be given with the liquid crystal display 121 applied as the information output unit 120.

Furthermore, the buzzer is a component which electrically vibrates a metal plate or the like and then outputs sound in the same manner as the speaker.

The information storage unit 130 is a component which stores various types of information required to individually identify a plurality of possessions possessed by a possessor and to track the location of a specific possession designated by the possessor among the plurality of possessions possessed by the possessor, such as per-tag ID information which is the IDs of the possession tags 200 provided in the possessions possessed by the possessor.

The information storage unit 130 which performs the above-described function may be one of flash memory, hard disk, a multimedia card, card-type memory (e.g., SD or XD memory, or the like), random access memory (RAM), static random access memory (SRAM), read-only memory (ROM), Electrically Erasable Programmable Read-Only Memory EEPROM, Programmable Read-Only Memory PROM, and magnetic memory, or a combination thereof.

The information communication unit 140 is a component which performs a communication interface function via which information required for a request for the tracking of the location of a designated one of the possession tags 200 of the possessions possessed by the possessor is transmitted.

The information communication unit 140 which performs the above-described function may include a short-range communication module and an RFID communication module for the purpose of wireless communication between the user terminal 300 and the possession tag 200.

First, the short-range communication module may select and use any one of Bluetooth communication, infrared communication, visible light communication, human body communication or mediated communication, ZigBee communication, near field communication (NFC), and radio frequency identification (RFID) communication. In the present embodiment of the present invention, a description will be given with Bluetooth communication, particularly Bluetooth low energy (BLE) technology, applied. However, the short-range communication module is not limited to Bluetooth communication, but may select and use one or more of the above-described various short-range communication methods.

Furthermore, the RFID communication module has an information transmission distance of about 10 m, and may be an ultra-high frequency (UHF) RFID communication module using a frequency band of about 860 to 960 MHz.

The control unit 150 is a component which controls all operations required to individually identify a plurality of possessions possessed by a possessor and to track the location of a specific possession designated by the possessor among the plurality of possessions possessed by the possessor, such as the input, output and transmission of information required for the selection of the ID of one of possession tags 200 provided in respective possessions possessed by a possessor and a request for the tracking of the location of a possession tag 200 provided in a corresponding possession having the tag ID is input.

The possession location tracking terminal 100 which is configured as described above may provide service configured to, when the location of a specific possession designated by a possessor among a plurality of possessions possessed by the possessor is tracked, allow guidance on the location of the tracked specific possession to be selectively output via the specific possession or the terminal according to the selection of the possessor.

For this purpose, as a mode in which the operation method of the control unit 150 is set, the possession location tracking terminal 100 may be set to a tag guidance mode in which when the designated one of the possession tags 200 of the possessions possessed by the possessor is detected through the tracking of the location of the designated possession tag 200, the designated possession tag 200 provides guidance on its own location.

When the possession location tracking terminal 100 is set to the tag guidance mode as described above, the control unit 150, when detecting the designated one of the possession tags 200 of the possessions possessed by the possessor through the tracking of the location of designated possession tag 200, performs the function of performing control such that a tag output signal requesting the designated possession tag 200 to provide guidance on its own location is generated.

As described above, the possessions which may be applied when the possession location tracking terminal 100 is set to the tag guidance mode may include common possessions such as a smartphone and the remote controllers of various types of electronic devices. In this case, the possession tag 200 provided in the corresponding possession outputs outgoing sound providing guidance on a location so that the possessor can more rapidly find the corresponding possession.

Meanwhile, the information providing guidance on a location provided by the possession tag 200 may be outgoing sound, vibration, light, or a combination thereof.

Furthermore, as a mode in which the operation method of the control unit 150 is set, the possession location tracking terminal 100 may be set to a main body guidance mode in which when the designated one of the possession tags 200 of the possessions possessed by the possessor is detected through the tracking of the location of the designated possession tag 200, the possession location tracking terminal 100 outputs information about the detection of the designated possession tag 200.

When the possession location tracking terminal 100 is set to the main body guidance mode as described above, the control unit 150, when the location of the designated one of the possession tags 200 of the possessions possessed by the possessor is detected through the tracking of the designated possession tag 200, performs the function of performing control such that information about the detection of the designated possession tag 200 can be output through a buzzer or speaker, which is the information output unit 120.

As described above, the possessions which may be applied when the possession location tracking terminal 100 is set to the main body guidance mode may include precious metals such as gold, silver and diamond, various types of bankbooks, important documents such as warranty deeds, and valuables such as a legal seal. The possessor usually distributes and stores valuables in various places in a house which outsiders do not know. In this case, when a corresponding valuable, which is a specific possession desired by the possessor, emits output sound providing guidance on a location, the following problem occurs.

The reason for this is that when an outsider who trespasses on the house of the possessor requests the tracking of a location by randomly inputting the ID list of the possession tags 200, the corresponding location may be easily divulged.

Accordingly, the main body guidance mode is used to perform control so that output sound providing guidance on a location is output from the possession location tracking terminal 100. In order to maximize security efficiency, it is preferable that a detection distance, which is a distance between the possession location tracking terminal 100 and the possession tag 200 provided in the corresponding valuable, be also set by the possessor who possesses the valuable.

In other words, in the case where the possessor determines that the value of the possession is low and sets the detection distance to 1 m, when the possessor moves throughout his house while holding the possession location tracking terminal 100 in order to track the corresponding possession, output sound providing guidance on a location is output from the possession location tracking terminal 100 only when the distance between the possession location tracking terminal 100 possessed by the possessor and the possession tag 200 provided in the corresponding valuable, the location of which is being tracked, falls within 1 m.

In the case where the possessor determines that the value of the possession is high, he or she sets the detection distance to 30 cm or less. In this case, the divulgence of various valuables, distributed and stored in various spaces in a house, to an outsider may be minimized, and the possessor may designate and track one of the valuables.

For this purpose, the information storage unit 130 of the possession location tracking terminal 100 stores and manages per-received signal strength distance information which is indicative of the distances from the possession location tracking terminal 100 having received the per-tag ID signals from the possession tags 200 based on the detected signal strengths of the received per-tag ID signals so that the distance between the possession tags 200 and the possession location tracking terminal 100 can be determined, and user-designated detection distance information which is information designated by a user and which is indicative of a set distance over which the possession location tracking terminal 100 can detect the possession tag 200 during the tracking of a location.

Furthermore, when the control unit 150 of the possession location tracking terminal 100 receives a per-tag ID signal from the possession tag 200 in the main body guidance mode, the control unit 150 becomes aware of the corresponding possession tag 200 by reference to the received corresponding per-tag ID signal, detects the signal strength of the received per-tag ID signal, determines the detection distance between the possession location tracking terminal 100 and the possession tag 200 by matching the detected signal strength of the per-tag ID signal against the per-received signal strength distance information stored in the information storage unit 130, and, when the detection distance corresponds to the user-designated detection distance information stored in the information storage unit 130, performs the function of performing control such that information about the detection of the designated possession tag 200 is output via the information output unit 120.

Meanwhile, the main body guidance mode and the tag guidance mode may be set using various methods, an example of which will be described below.

First, the possession location tracking terminal 100 includes a housing, which includes a stationary body 101 on which a circuit substrate, on which the information storage unit 130, the information communication unit 140, and the control unit 150 are mounted, is disposed, and an extension-type movable member 102 which slides into the stationary body 101.

In this case, a main body guidance mode request button 103 which is electrically connected to the circuit substrate and requests the setting of the main body guidance mode is disposed at an end of the stationary body 101. When the stationary body 101 and the extension-type movable member 102 are not extended and retracted, the tag guidance mode is set. In contrast, when the extension-type movable member 102 slides from the stationary body 101 and a length is extended, the main body guidance mode is set. Thereafter, the service of tracking the location of the specific possession requested by the possessor is performed.

The possession location tracking terminal 100 which performs the above-described function may be charged with power and then used. A charging body, such as a cradle, may be provided to charge the possession location tracking terminal 100 with power.

Furthermore, the possession location tracking terminal 100 may be detachably attached onto a wall. In this case, the attachment and the detachment may be provided using various attachment and detachment members, such as a magnet and Velcro tape.

A system for providing the service of tracking the location of a specific possession requested by a possessor by using the possession location tracking terminal 100 having the above-described configuration will be described based on a tag guidance mode and a main body guidance mode below.

First, a location tracking system using a terminal for tracking the location of an article set by an individual in a tag guidance mode includes the possession tags 200 and the possession location tracking terminal 100.

The possession tags 200 are provided in the possessions possessed by the possessor, respectively. Each of the possession tags 200 is a component which transmits a per-tag ID signal, including tag ID information used to identify the corresponding tag, at preset intervals and on which a buzzer is mounted. When receiving a tag output signal from the possession location tracking terminal 100 to be described later, the possession tag 200 determines whether tag ID information included in the received tag output signal and its own tag ID information are the same, and performs the function of performing control such that output sound is transmitted through the buzzer only when the tag ID information included in the received tag output signal and its own tag ID information are the same.

In order to perform the above-described function, an active tag equipped with its own battery power may be used as the possession tag 200 which is used in the tag guidance mode.

The possession location tracking terminal 100 is a component which, when receiving per-tag ID signals from the possession tags 200, determines whether the per-tag ID signal of a tracking target possession tag of the possession tags 200 provided in the possessions possessed by the possessor is present, generates a tag output signal, including the tag ID information of the corresponding possession tag 200, as a signal requesting the corresponding possession tag 200 to provide guidance on a location, and transmits the tag output signal.

The possession location tracking terminal 100 which performs the above-described function includes an information input unit 110, an information output unit 120, an information storage unit 130, an information communication unit 140, and a control unit 150, which have the same ⊐ functions, as described above.

However, the differences lie in that the control unit 150 performs control such that information required for the selection of an ID from among the IDs of the possession tags 200 provided in the possessions possessed by the possessor and a request for the tracking of the location of the possession tag 200 provided in the corresponding possession having the tag ID is input, output and transmitted. Furthermore, the control unit 150, when per-tag ID signals are received from the possession tags 200, performs control to determine whether the per-tag ID signal of a tracking target possession tag of the possession tags 200 provided in the possessions possessed by the possessor is present, to generate a tag output signal, including the tag ID information of the corresponding possession tag 200, as a signal requesting the corresponding possession tag 200 to provide guidance on a location, and to transmit the tag output signal.

Meanwhile, the location tracking system using a terminal for tracking the location of an article set by an individual according to the present invention further includes a user terminal 300 equipped with a possession location tracking app 301 which controls the possession location tracking terminal 100 connected through Bluetooth pairing so that one of the IDs of the possession tags 200 provided in the possessions possessed by the possessor is selected and the tracking of the location of the possession tag 200 provided in the corresponding possession having the tag ID is requested.

In this case, the possession location tracking app 301 is an application program, and is provided in the user terminal 300 in an embedded manner or in the operating system (OS) of the user terminal 300 in an installed manner. In other words, the possessor may connect with an app store via the user terminal 300, may download the possession location tracking app 301, and may use the possession location tracking app 301.

Furthermore, a per-tag possession detection guidance screen 400 which is stored in user terminal 300 and is managed by the possession location tracking app 301 is a screen which is output to the display unit 310 of the user terminal 300. The per-tag possession detection guidance screen 400 is an output screen which includes tag ID columns 410 into which tag IDs used to identify the possession tags 200 are entered and possession name columns 420 into which the names of corresponding possessions provided with the possession tags having the corresponding tag IDs are entered.

The possessor operates the per-tag possession detection guidance screen 400, managed through the possession location tracking app 301, via the direct information input unit 110 so that the possession tags 200 attached or connected to and provided in the respective possessions can be distinctively and intuitively identified, thereby enabling the IDs of possession tags 200 provided in many possessions to be accurately identified.

Figure 6:
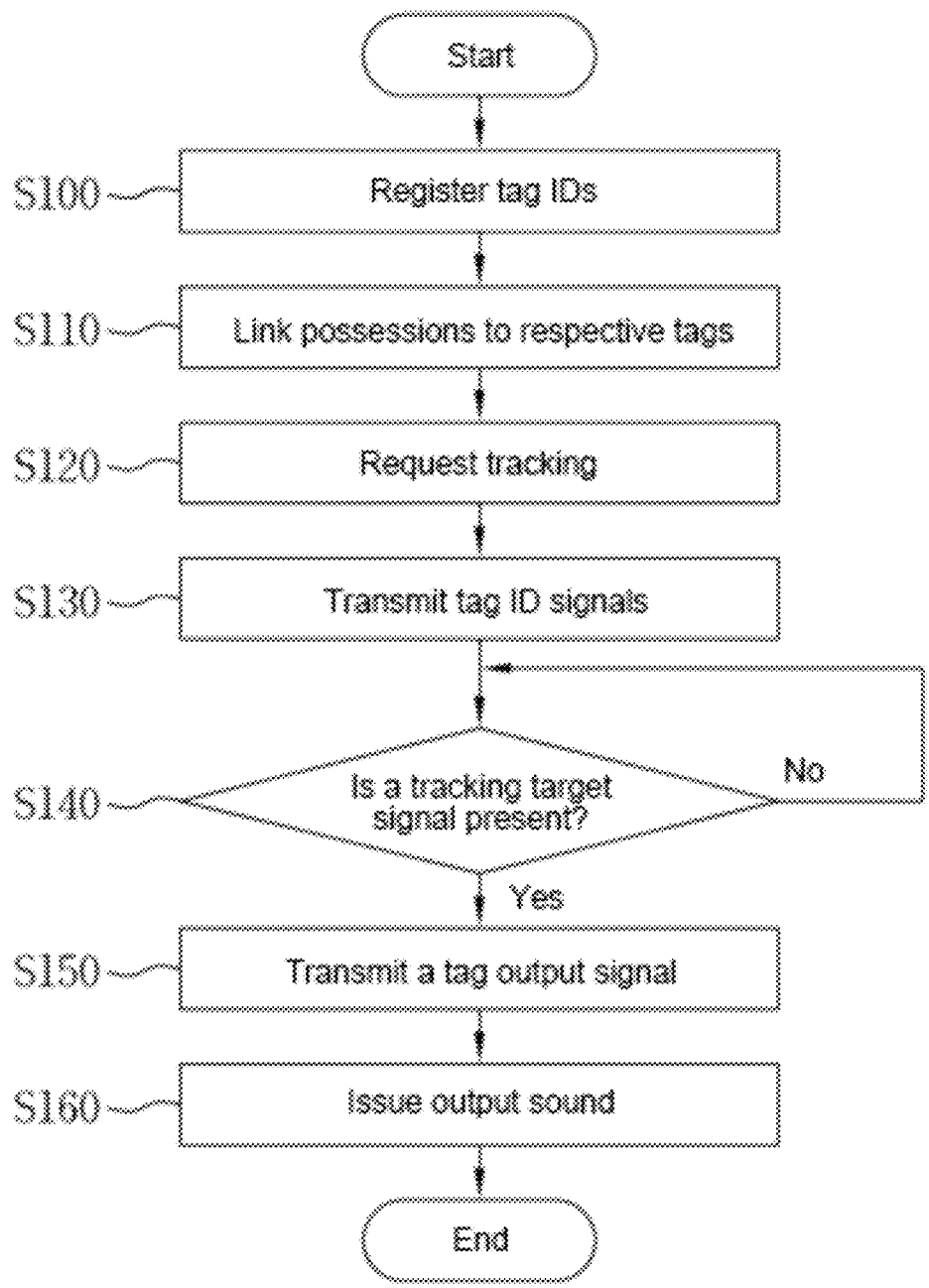
FIG. 6 is a flowchart showing a process in which a specific possession designated by a possessor among a plurality of possessions possessed by the possessor outputs guidance on the location of the specific possession when the location of the specific possession is tracked through the operation of the location tracking system using a terminal for tracking the location of an article set by an individual.

A process in which a specific possession designated by a possessor among a plurality of possessions possessed by the possessor outputs guidance on the location of the specific possession when the location of the specific possession is tracked through the operation of the location tracking system using a terminal for tracking the location of an article set by an individual, which is configured as described above, will be described with reference to FIG. 6.

First, the possession tags 200 provided in the possessions possessed by the possessor are sequentially registered in the possession location tracking terminal 100 at step S100. This is performed through pairing.

Thereafter, the possessor outputs the per-tag possession detection guidance screen 400 by executing the possession location tracking app 301 provided in the possession location tracking terminal 100, enters information into the tag ID columns 410 and the possession name columns 420 in accordance with an entry form, and then stores the information, thereby setting information about the links of the possessions of the possessor for the respective registered possession tags 200 at step S110.

In this case, control may be performed by controlling the operation of the possession location tracking terminal 100 by means of the possession location tracking app 301 of the user terminal 300 such that the information about the links of the possessions of the possessor can be set for the respective registered possession tags 200.

Thereafter, when the possessor requests the tracking of a possession tag 200 provided in a desired possession by operating the information input unit 110 of the possession location tracking terminal 100, the control unit 150 of the possession location tracking terminal 100 becomes aware of a tracking target tag of the possession tags 200 provided in the possessions possessed by the possessor at step S120.

Meanwhile, the possession tags 200 transmit per-tag ID signals, including tag ID information used to identify the corresponding tags, at preset intervals at step S130. The possessor collects the per-tag ID signals transmitted from the possession tags 200 by means of the possession location tracking terminal 100 while holding the possession location tracking terminal 100 and moving throughout his or her house.

When the per-tag ID signals are received from the possession tags 200, the control unit 150 of the possession location tracking terminal 100 checks whether the per-tag ID signal of the tracking target tag of the possession tags 200 provided in the possessions possessed by the possessor is present at step S140.

When the per-tag ID signal of the tracking target tag of the possession tags 200 provided in the possessions possessed by the possessor is present, the control unit 150 of the possession location tracking terminal 100 generates and transmits a tag output signal, including the tag ID information of the corresponding possession tag 200, as a signal requesting the corresponding possession tag 200 to provide guidance on a location at step S150.

Thereafter, the tracking target possession tag 200 receives the tag output signal, and, when the tag ID information included in the transmitted tag output signal is the same as its own tag ID information, performs control such that output sound is issued via a buzzer at step S160, thereby guiding the possessor to the location of the desired possession.

Furthermore, the location tracking system using a terminal for tracking the location of an article set by an individual in a main body guidance mode includes the possession tags 200, to which active tags equipped with battery power are applied, and the possession location tracking terminal 100.

However, the difference lies in that the possession tags 200 may be implemented without a buzzer. For this reason, not only active tags equipped with their own battery power but also passive tags configured to receive a ID output request signal from the possession location tracking terminal 100 and to transmit a per-tag ID signal by using electromotive force induced by the received ID output request signal may be used as the possession tags 200 which are used in a tag guidance mode. This will be described in detail below.

Furthermore, when per-tag ID signals are received from the possession tags 200, the possession location tracking terminal 100 checks whether the per-tag ID signal of the tracking target tag of the possession tags 200 provided in the possessions possessed by the possessor is present, and, when the per-tag ID signal of the tracking target tag is present, performs the function of providing guidance so that information about the detection of the tracking target possession tag 200 can be output.

The possession location tracking terminal 100 which performs the above-described function includes an information input unit 110, an information output unit 120, an information storage unit 130, an information communication unit 140, and a control unit 150 in a tag guidance mode, which have the same functions.

However, the differences lie in that when per-tag ID signals are received from the possession tags 200, the control unit 150 performs control such that whether the per-tag ID signal of the tracking target tag of the possession tags 200 provided in the possessions possessed by the possessor is present can be checked and information about the detection of the tracking target possession tag 200 can be output when the per-tag ID signal of the tracking target tag is present.

Furthermore, the information storage unit 130 stores per-received signal strength distance information which is indicative of the distances from the possession location tracking terminal 100 having received the per-tag ID signals from the possession tags 200 based on the detected signal strengths of the received per-tag ID signals so that the distance between the possession tags 200 and the possession location tracking terminal 100 can be determined, and user-designated detection distance information which is information designated by a user and which is indicative of a set distance over which the possession location tracking terminal 100 can detect the possession tag 200 during the tracking of a location.

Through this, the control unit 150 further performs the function of performing control to, when receiving a per-tag ID signal from one of the possession tags 200 in a main body guidance mode, become aware of a corresponding possession tag 200 by reference to the received corresponding per-tag ID signal, detect the signal strength of the received per-tag ID signal, determine the detection distance between the possession location tracking terminal 100 and the possession tag 200 by matching the detected signal strength of the per-tag ID signal against the per-received signal strength distance information stored in the information storage unit 130, and output information about the detection of the designated possession tag 200 via the information output unit 120 when the detection distance corresponds to the user-designated detection distance information stored in the information storage unit 130.

Meanwhile, in order to set the main body guidance mode in the possession location tracking terminal 100, when the length is extended by sliding the extension-type movable member 102 from the stationary body 101 which is a housing constituting the possession location tracking terminal 100, the main body guidance mode request button 103 provided at the rear end of the stationary body 101 is pressed by the front end of the extension-type movable member 102.

Furthermore, the possession location tracking terminal 100 in the main body guidance mode may perform the function of performing the selection of the ID of one of possession tags 200 provided in respective possessions possessed by a possessor and making a request for the tracking of the location of a possession tag 200 provided in a corresponding possession having the tag ID by performing controls via the user terminal 300 in which the possession location tracking app 301 is provided.

Figure 7:
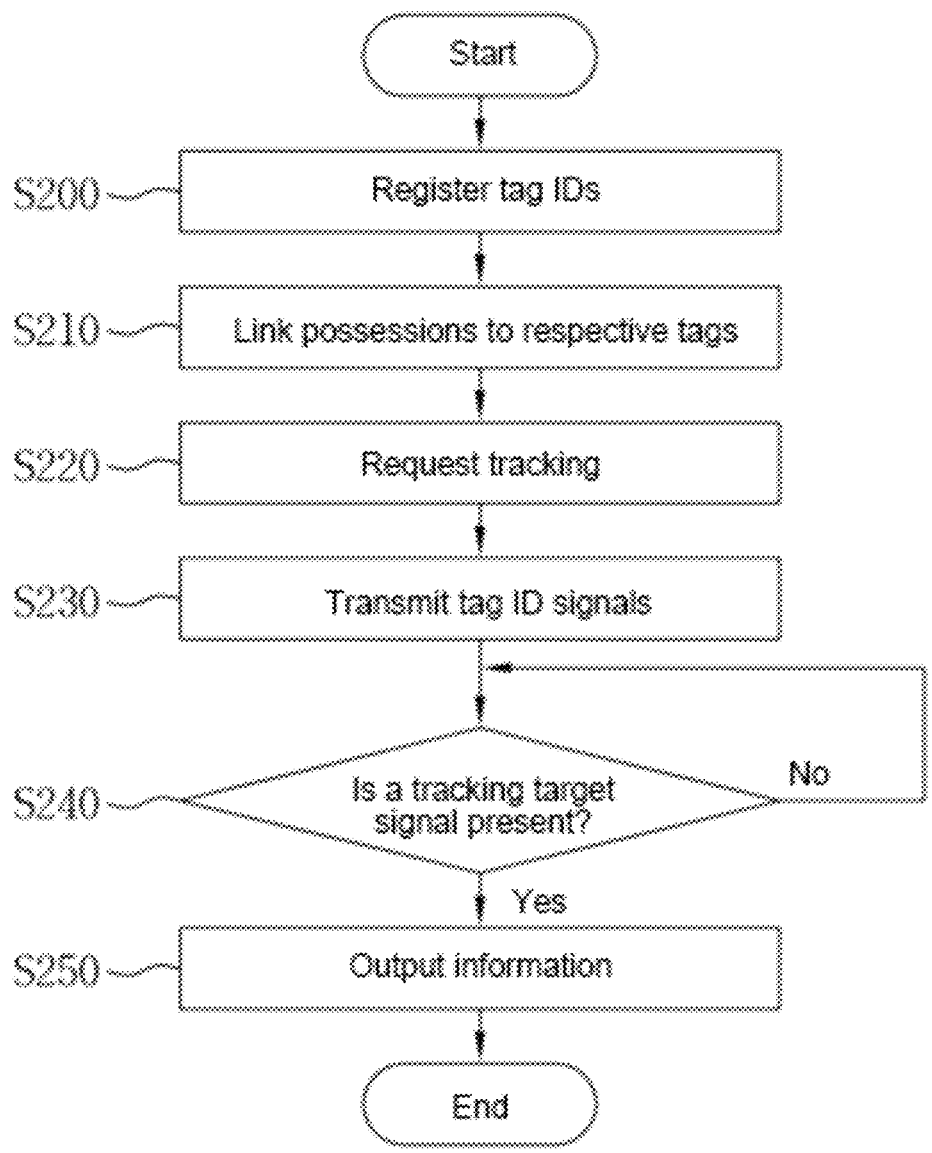
FIGS. 7 and 8 are flowcharts showing a process in which a possession location tracking terminal outputs guidance on the location of a tracked specific possession when the location of the specific possession designated by the possessor is tracked through the operation of the location tracking system using a terminal for tracking the location of an article set by an individual in a state in which active tags have been provided as possession tags provided in a plurality of respective possessions possessed by the possessor.
Figure 8:
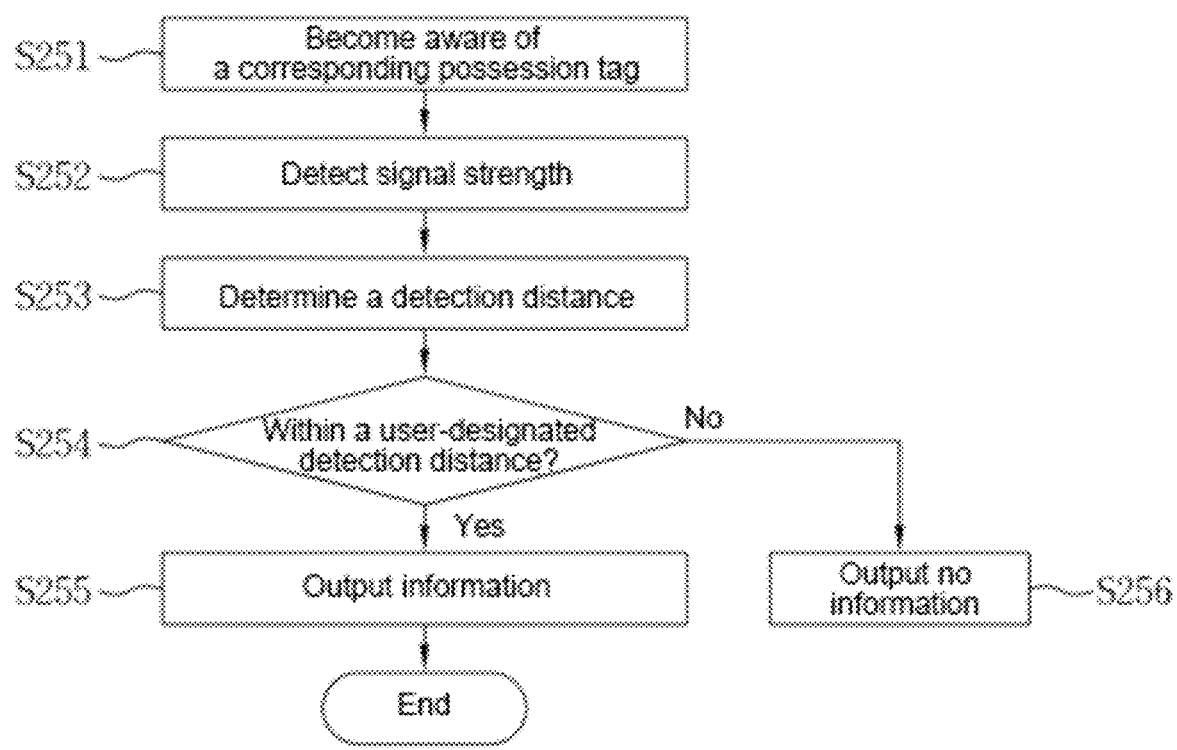

A process in which the possession location tracking terminal 100 outputs guidance on the location of a tracked specific possession when the location of the specific possession designated by the possessor is tracked through the operation of the location tracking system using a terminal for tracking the location of an article set by an individual, which is configured as described above, in a state in which active tags have been provided as possession tags 200 provided in a plurality of respective possessions possessed by the possessor will be described with reference to FIGS. 7 and 8 below.

First, the possession tags 200 provided in the possessions possessed by the possessor are sequentially registered in the possession location tracking terminal 100 at step S200. This is performed through pairing.

Thereafter, the possessor outputs the per-tag possession detection guidance screen 400 by executing the possession location tracking app 301 provided in the possession location tracking terminal 100, enters information into the tag ID columns 410 and the possession name columns 420 in accordance with an entry form, and then stores the information, thereby setting information about the links of the possessions of the possessor for the respective registered possession tags 200 at step S210.

In this case, control may be performed by controlling the operation of the possession location tracking terminal 100 by means of the possession location tracking app 301 of the user terminal 300 such that the information about the links of the possessions of the possessor can be set for the respective registered possession tags 200.

Thereafter, the execution of the main body guidance mode is requested in such a manner that the main body guidance mode request button 103 provided at the rear end of the stationary body 101 is pressed by the front end of the extension-type movable member 102 by extending the length by sliding the extension-type movable member 102 from the stationary body 101 which is a housing constituting the possession location tracking terminal 100. In the main body guidance mode, when the tracking of a possession tag 200 provided in a desired possession is requested via the information input unit 110 of the possession location tracking terminal 100, the control unit 150 of the possession location tracking terminal 100 becomes aware of the tracking target tag of the possession tags 200 provided in the possessions possessed by the possessor at step S220.

Meanwhile, the possession tags 200 transmit per-tag ID signals, including tag ID information used to identify the corresponding tags, at preset intervals at step S230. The possessor collects the per-tag ID signals transmitted from the possession tags 200 by means of the possession location tracking terminal 100 while holding the possession location tracking terminal 100 and moving throughout his or her house.

When the per-tag ID signals are received from the possession tags 200, the control unit 150 of the possession location tracking terminal 100 checks whether the per-tag ID signal of the tracking target tag of the possession tags 200 provided in the possessions possessed by the possessor is present at step S240.

Thereafter, when the per-tag ID signal of the tracking target tag of the possession tags 200 provided in the possessions possessed by the possessor is present, the control unit 150 of the possession location tracking terminal 100 performs control such that information about the detection of the tracking target possession tag 200 can be output at step S250.

In this case, in the possession location tracking terminal 100, a process in which control is performed so that information about the detection of the tracking target possession tag 200 can be output at step S250 may be provided based on the following detailed steps.

First, when receiving a per-tag ID signal from one of the possession tags 200, the possession location tracking terminal 100 becomes aware of the corresponding possession tag 200 by reference to the received corresponding per-tag ID signal at step S251.

Thereafter, the possession location tracking terminal 100 detects the signal strength of the received per-tag ID signal at step S252.

Thereafter, the possession location tracking terminal 100 determines the detection distance between the possession location tracking terminal 100 and the tracking target possession tag 200 by matching the detected signal strength of the per-tag ID signal against the preset per-received signal strength distance information at step S253.

Thereafter, the possession location tracking terminal 100 checks whether the determined detection distance corresponds to the predetermined user-designated detection distance information at step S254, and, when the determined detection distance corresponds to the predetermined user-designated detection distance information, performs control such that information about the detection of the tracking target possession tag 200 can be output at step S255.

Meanwhile, when the determined detection distance does not correspond to the predetermined user-designated detection distance information at step S254 of checking whether the determined detection distance corresponds to the predetermined user-designated detection distance information, the possession location tracking terminal 100 performs control such that information about the detection of the tracking target possession tag 200 can be prevented from being output at step S256.

In addition, the location tracking system using a terminal for tracking the location of an article set by an individual body in a guidance mode state, to which passive tags, which are driven by induced electromotive force, are applied, includes a possession location tracking terminal 100 which transmits an ID output request signal including a per-tag ID signal of a tracking target possession tag of possession tags 200 provided in possessions possessed by a possessor at preset intervals, and possession tags 200 which receive ID output request signals from the possession location tracking terminal 100 and transmit per-tag ID signals by using electromotive force, induced from the received ID output request signals, as power. When per-tag ID signals are received from the possession tags 200, the possession location tracking terminal 100 checks whether the per-tag ID signal of the tracking target possession tag of possession tags 200 provided in possessions possessed by the possessor, and, when the per-tag ID signal of the tracking target possession tag is present, performs the function of providing guidance such that information about the detection of the tracking target possession tag 200 is output.

Figure 9:
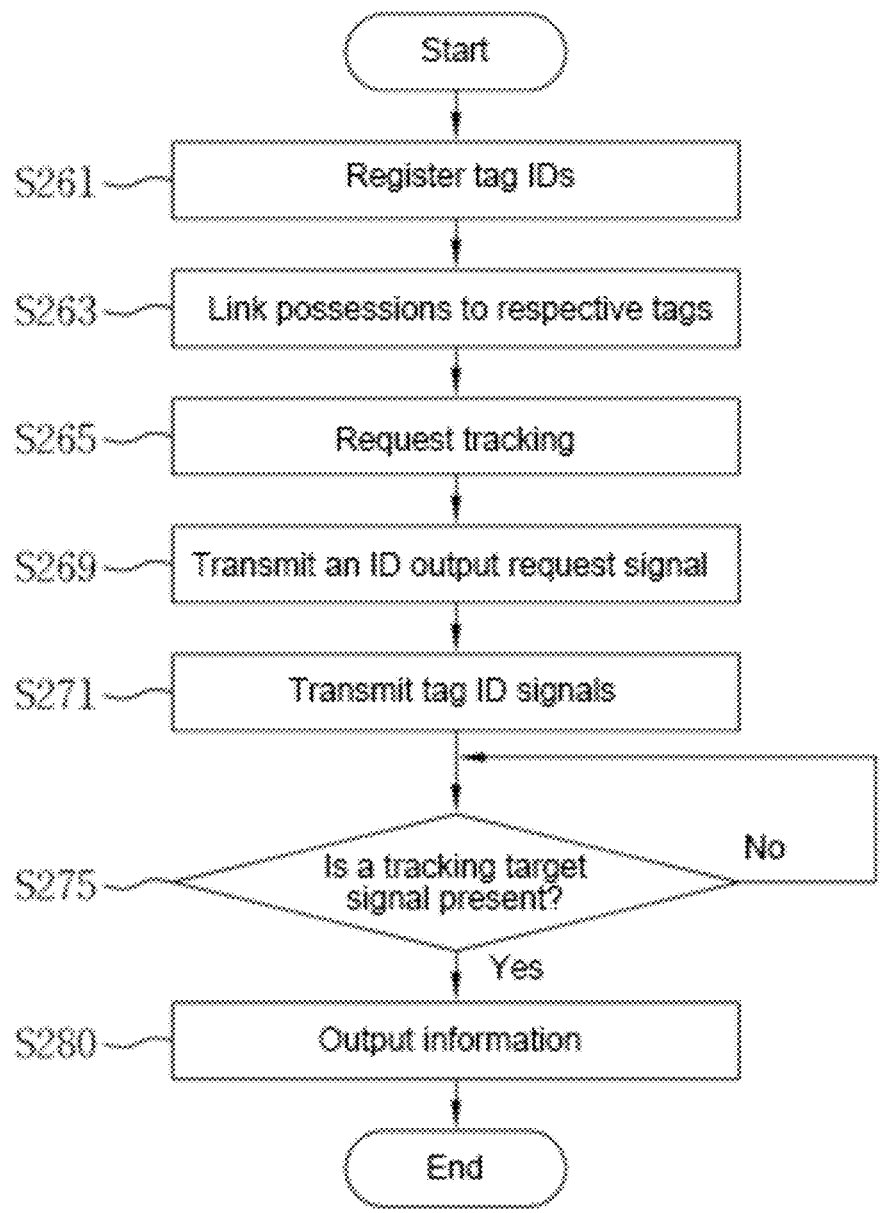
FIGS. 9 and 10 are flowcharts showing a process in which a possession location tracking terminal outputs guidance on the location of a tracked specific possession when the location of the specific possession designated by a possessor is tracked through the operation of the location tracking system using a terminal for tracking the location of an article set by an individual in a state in which passive tags have been provided as possession tags provided in a plurality of respective possessions possessed by the possessor.
Figure 10:
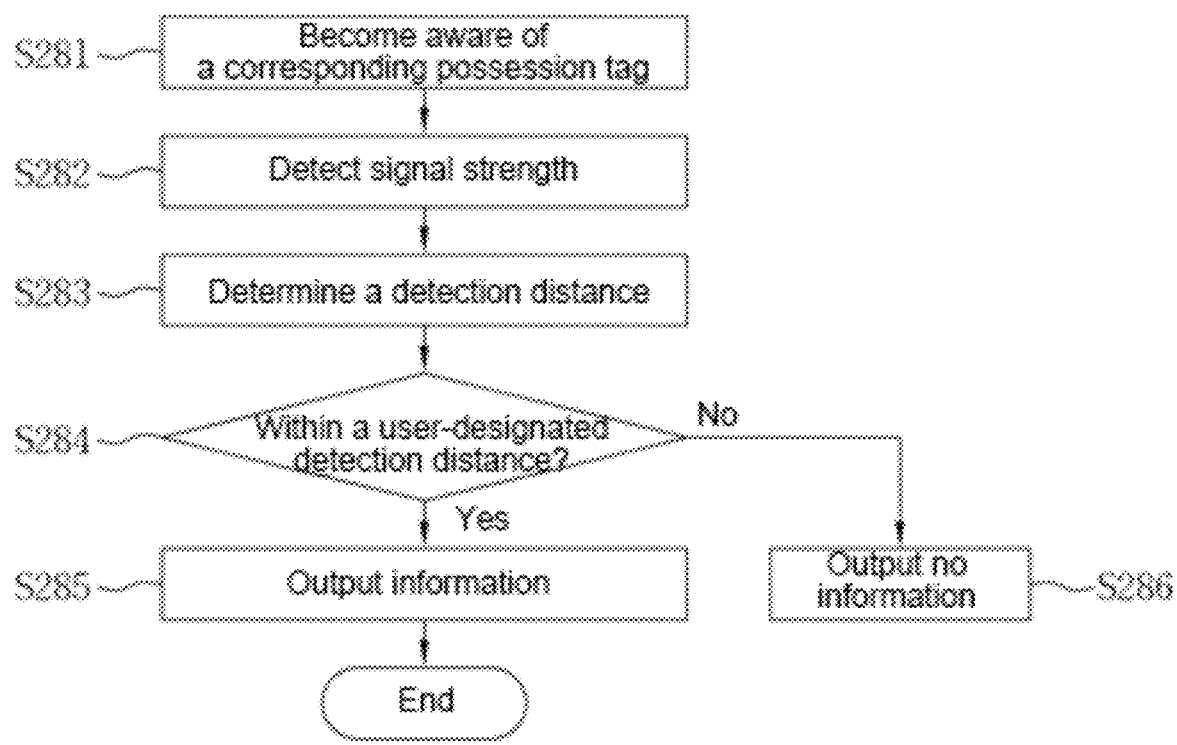

A process in which the possession location tracking terminal 100 outputs guidance on the location of a tracked specific possession when the location of the specific possession designated by a possessor is tracked through the operation of the location tracking system using a terminal for tracking the location of an article set by an individual, which is configured as described above, in a state in which passive tags have been provided as possession tags 200 provided in a plurality of respective possessions possessed by the possessor will be described with reference to FIGS. 9 and 10 below.

The process includes: step S261 of registering possession tags 200, provided in possessions possessed by a possessor, in the possession location tracking terminal 100; step S263 of setting information about the links of the possessions of the possessor for the respective registered possession tags 200 in such a manner that the possessor outputs the per-tag possession detection guidance screen 400 by executing the possession location tracking app 301 provided in the possession location tracking terminal 100, enters information into the tag ID columns 410 and the possession name columns 420 in accordance with an entry form, and then stores the information; step S265 of becoming aware of, by the possession location tracking terminal 100, the tracking target possession tag of the possession tags 200 provided in the possessions possessed by the possessor; step S269 of transmitting, by the possession location tracking terminal 100, an ID output request signal, including the per-tag ID signal of the tracking target possession tag 200 at preset intervals; step S271 of receiving, by the possession tags 200, the ID output request signal from the possession location tracking terminal 100 and transmitting, by the possession tags 200, per-tag ID signals by using electromotive force, induced by the received ID output request signal, power; step S275 of checking, by the possession location tracking terminal 100, whether the per-tag ID signal of the tracking target possession tag of the possession tags 200 provided in the possessions possessed by the possessor is present when per-tag ID signals are received from the possession tags 200; and step S280 of, when the per-tag ID signal of the tracking target possession tag of the possession tags 200 provided in the possessions possessed by the possessor is present, performing, by the possession location tracking terminal 100, control such that information about the detection of the tracking target possession tag 200 is output.

In this case, step S280 of, when the per-tag ID signal of the tracking target possession tag of the possession tags 200 provided in the possessions possessed by the possessor is present, performing, by the possession location tracking terminal 100, control such that information about the detection of the tracking target possession tag 200 is output may be provided based on the following detailed steps.

First, when a per-tag ID signal is received from one of the possession tags 200, the possession location tracking terminal 100 becomes aware of a corresponding possession tag 200 by reference to the received corresponding per-tag ID signal at step S281.

Thereafter, the possession location tracking terminal 100 detects the signal strength of the received per-tag ID signal at step S282.

Thereafter, the possession location tracking terminal 100 determines the detection distance between the possession location tracking terminal 100 and the tracking target possession tag 200 by matching the detected signal strength of the per-tag ID signal against the preset per-received signal strength distance information at step S283.

Thereafter, the possession location tracking terminal 100 checks whether the determined detection distance corresponds to the predetermined user-designated detection distance information at step S284, and, when the determined detection distance corresponds to the predetermined user-designated detection distance information, performs control such that information about the detection of the tracking target possession tag 200 is output at step S285.

Meanwhile, when the determined detection distance does not correspond to the predetermined user-designated detection distance information at step S284 of checking whether the determined detection distance corresponds to the predetermined user-designated detection distance information, the possession location tracking terminal 100 performs control such that information about the detection of the tracking target possession tag 200 can be prevented from being output at step S286.

The location tracking system using a terminal for tracking the location of an article set by an individual according to the present invention may be selectively set to a main body guidance mode and a tag guidance mode.

For this purpose, the location tracking system using a terminal for tracking the location of an article set by an individual according to the present invention, which may be selectively set to a main body guidance mode and a tag guidance mode, includes: a possession location tracking terminal 100 which includes a control unit 150 configured to perform control such that information required for the selection of the ID of one of possession tags 200 provided in possessions possessed by a possessor and a request for the tracking of the location of a possession tag 200 provided in a corresponding possession having the tag ID can be input, output and transmitted; and possession tags 200 which are provided in the possessions possessed by the possessor and which transmit per-tag ID signals, including tag ID information used to identify the corresponding tags, at preset intervals.

Through this, when the mode to which the operation method of the control unit 150 is set is a tag guidance mode in which a designated possession tag 200 provides guidance on its own location when the designated possession tag 200 is detected through the tracking of the location of the designated one of the possession tags 200 of the possessions possessed by the possessor, the possession location tracking terminal 100 controls the control unit 150, and performs control such that a tag output signal requesting the designated possession tag 200 to provide guidance on a location can be generated when the designated possession tag 200 is detected through the tracking of the location of the designated one of the possession tags 200 of the possessions possessed by the possessor.

Thereafter, the possession location tracking terminal 100 transmits the tag output signal when the mode to which the operation method of the control unit 150 is set is a tag guidance mode.

Thereafter, when receiving the tag output signal, the tracking target possession tag 200 performs control such that output sound is issued via a buzzer for the corresponding possession only when tag ID information included in the received tag output signal is the same as its own tag ID information.

Meanwhile, when the mode to which the operation method of the control unit 150 is set is a main body guidance mode in which the possession location tracking terminal 100 outputs information about the detection of the designated possession tag 200 when the designated possession tag 200 is detected through the tracking of the location of the designated one of the possession tags 200 of the possessions possessed by the possessor, the possession location tracking terminal 100 controls the control unit 150, and performs the selective function of performing control so that the information about the detection of the designated possession tag 200 is output via the information output unit 120 when the designated possession tag 200 is detected through the tracking of the location of the designated one of the possession tags 200 of the possessions possessed by the possessor.

The present invention in which the tag guidance mode and the main body guidance mode are selectively implemented basically includes: an information input unit 110 to which information required for the selection of the ID of one of possession tags 200 provided in possessions possessed by a possessor and a request for the tracking of the location of a possession tag 200 provided in a corresponding possession having the tag ID is input; an information output unit 120 which has a liquid crystal display 121 on which the information required for the selection of the ID of one of the possession tags 200 provided in the possessions possessed by the possessor is displayed; an information storage unit 130 in which per-tag ID information which is the IDs of the possession tags 200 provided in the possessions possessed by the possessor is stored; and an information communication unit 140 which performs the communication interface function of transmitting the information required for the request for the tracking of the location of the tracking target possession tag of the possession tags 200 provided in the possessions possessed by the possessor.

Furthermore, in order to set the main body guidance mode in the possession location tracking terminal 100, when the length is extended by sliding the extension-type movable member 102 from the stationary body 101 which is a housing constituting the possession location tracking terminal 100, the main body guidance mode request button 103 provided at the rear end of the stationary body 101 is pressed by the front end of the extension-type movable member 102.

Furthermore, the function of selecting the ID of one of possession tags 200 provided in possessions possessed by a possessor and requesting the tracking of the location of a possession tag 200 provided in a corresponding possession having the tag ID may be performed by controlling the possession location tracking terminal 100 via the user terminal 300 in which the possession location tracking app 301 is provided.

For this purpose, a per-tag possession detection guidance screen 400 which is a screen which is output onto the display unit 310 of the user terminal 300 and which includes tag ID columns 410 into which tag IDs used to identify possession tags 200 are entered and possession name columns 420 into which the names of corresponding possessions, in which possession tags having the corresponding tag IDs are provided, are entered is stored and managed via the possession location tracking app 301 provided in the user terminal 300.

Furthermore, the information storage unit 130 stores per-received signal strength distance information which is indicative of the distances from the possession location tracking terminal 100 having received the per-tag ID signals from the possession tags 200 based on the detected signal strengths of the received per-tag ID signals so that the distance between the possession tags 200 and the possession location tracking terminal 100 can be determined, and user-designated detection distance information which is information designated by a user and which is indicative of a set distance over which the possession location tracking terminal 100 can detect the possession tag 200 during the tracking of a location.

Through this, the control unit 150 further performs the function of performing control to, when receiving a per-tag ID signal from one of the possession tags 200 in a main body guidance mode, become aware of a corresponding possession tag 200 by reference to the received corresponding per-tag ID signal, detect the signal strength of the received per-tag ID signal, determine the detection distance between the possession location tracking terminal 100 and the possession tag 200 by matching the detected signal strength of the per-tag ID signal against the per-received signal strength distance information stored in the information storage unit 130, and output information about the detection of the designated possession tag 200 via the information output unit 120 when the detection distance corresponds to the user-designated detection distance information stored in the information storage unit 130.

Figure 11:
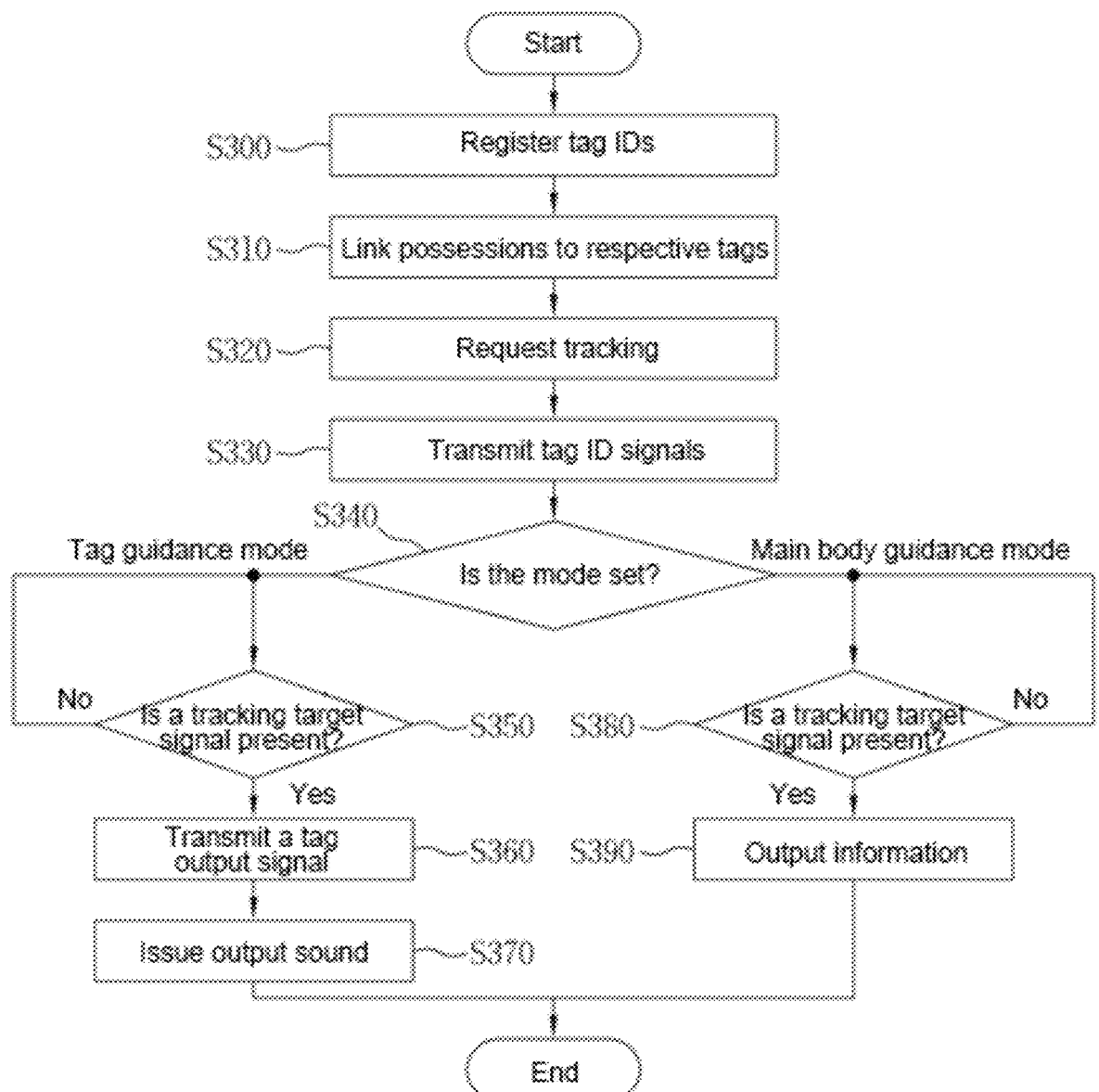
FIGS. 11 and 12 are flowcharts showing a process in which a specific possession or terminal selectively outputs guidance on the location of a tracked specific possession according to the selection of a possessor when the location of the designated possession tag of possession tags provided in a plurality of possessions possessed by the possessor is tracked through the operation of the location tracking system using a terminal for tracking the location of an article set by an individual according to the present invention.
Figure 12:
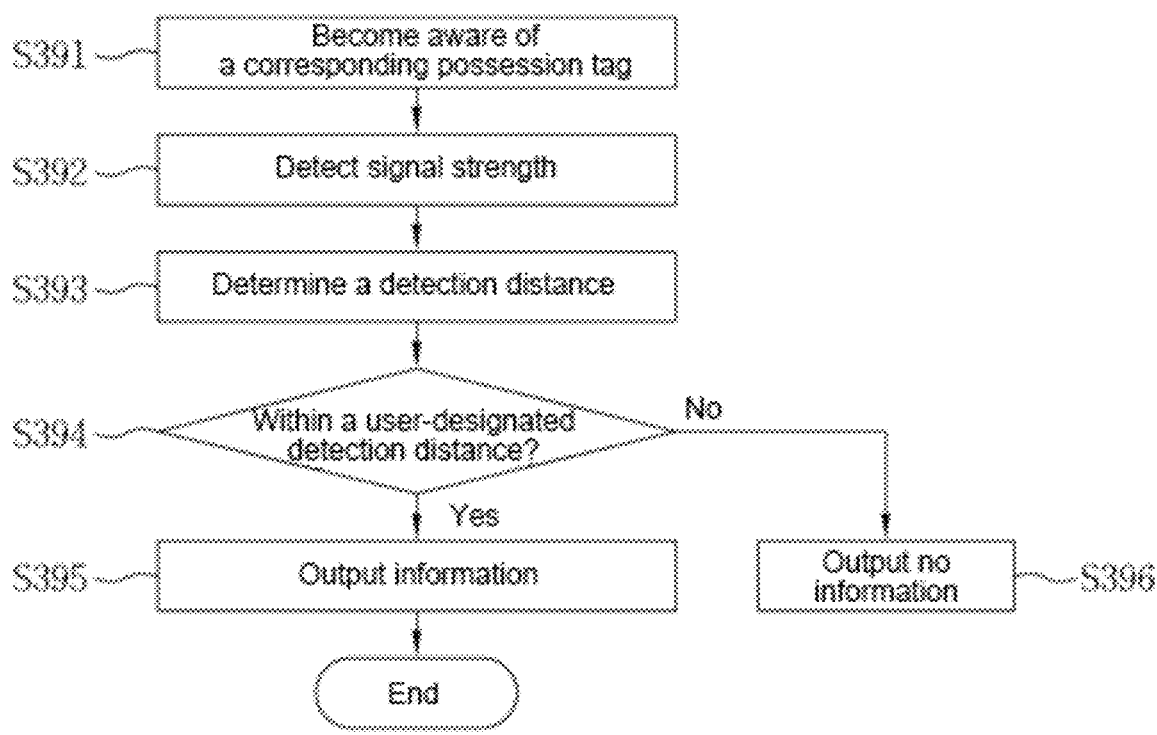

A process in which a specific possession or terminal selectively outputs guidance on the location of a tracked specific possession according to the selection of a possessor when the location of the designated possession tag of possession tags provided in a plurality of possessions possessed by the possessor is tracked through the operation of the location tracking system using a terminal for tracking the location of an article set by an individual according to the present invention will be described with reference to FIGS. 11 and 12 below.

First, the possession tags 200 provided in the possessions possessed by the possessor are registered in the possession location tracking terminal 100 through pairing at step S300.

Thereafter, the possessor outputs the per-tag possession detection guidance screen 400 by executing the possession location tracking app 301 provided in the possession location tracking terminal 100, enters information into the tag ID columns 410 and the possession name columns 420 in accordance with an entry form, and then stores the information, thereby setting information about the links of the possessions of the possessor for the respective registered possession tags 200 at step S310.

In this case, control may be performed by controlling the operation of the possession location tracking terminal 100 by means of the possession location tracking app 301 of the user terminal 300 such that the information about the links of the possessions of the possessor can be set for the respective registered possession tags 200.

The possession location tracking terminal 100 becomes aware of the tracking target possession tag of the possession tags 200 provided in the possessions possessed by the possessor at step S320.

The possession tags 200 transmit per-tag ID signals, including tag ID information used to identify the corresponding tags, at step S330.

The possession location tracking terminal 100 determines which of a tag guidance mode and a main body guidance mode is a set mode at step S340, and, when the set mode is a tag guidance mode, controls the control unit 150 so that the control unit 150 checks whether the per-tag ID signal of the tracking target possession tag 200 of the possession tags 200 provided in the possessions possessed by the possessor is present when per-tag ID signals are received from the possession tags 200 at step S350.

When the per-tag ID signal of the tracking target tag of the possession tags 200 provided in the possessions possessed by the possessor is present in the tag guidance mode, the control unit 150 of the possession location tracking terminal 100 generates and transmits a tag output signal, including the tag ID information of the corresponding possession tag 200, as a signal requesting the corresponding possession tag 200 to provide guidance on a location at step S360.

The tracking target possession tag 200 receives the tag output signal, and, when the tag ID information included in the transmitted tag output signal is the same as its own tag ID information, performs control such that output sound is issued via a buzzer at step S370.

Meanwhile, when a set mode is a main body guidance mode at step S340 of determining which of a tag guidance mode and a main body guidance mode is the set mode, the possession location tracking terminal 100 controls the control unit 150 so that the control unit 150 checks whether the per-tag ID signal of the tracking target possession tag 200 of the possession tags 200 provided in the possessions possessed by the possessor is present when per-tag ID signals are received from the possession tags 200 at step S380.

In this case, step S390 at which the control unit 150 of the possession location tracking terminal 100 performs control such that information about the detection of the tracking target possession tag 200 is output when the per-tag ID signal of the tracking target possession tag of the possession tags 200 provided in the possessions possessed by the possessor is present in the main body guidance mode may be provided based on the following detailed steps.

First, when a per-tag ID signal is received from one of the possession tags 200 in the main body guidance mode, the control unit 150 of the possession location tracking terminal 100 becomes aware of a corresponding possession tag 200 by reference to the received corresponding per-tag ID signal at step S391.

The control unit 150 of the possession location tracking terminal 100 detects the signal strength of the received per-tag ID signal in the main body guidance mode at step S392.

Thereafter, the control unit 150 of the possession location tracking terminal 100 determines the detection distance between the possession location tracking terminal 100 and the tracking target possession tag 200 by matching the detected signal strength of the per-tag ID signal against preset per-received signal strength distance information in the main body guidance mode at step S393.

Thereafter, the control unit 150 of the possession location tracking terminal 100 checks whether the determined detection distance corresponds to predetermined user-designated detection distance information in the main body guidance mode at step S394.

When the determined detection distance corresponds to the predetermined user-designated detection distance information in the main body guidance mode, the control unit 150 of the possession location tracking terminal 100 performs control such that information about the detection of the tracking target possession tag 200 is output at step S395. In contrast, when the determined detection distance does not correspond to the predetermined user-designated detection distance information in the main body guidance mode, the control unit 150 of the possession location tracking terminal 100 performs control such that information about the detection of the tracking target possession tag 200 can be prevented from being output at step S396.

The present invention provides the effect of individually identifying a plurality of possessions possessed by a possessor and tracking the location of a specific possession designated by the possessor among the plurality of possessions possessed by the possessor.

Furthermore, the present invention provides the effect of performing control such that a message providing guidance on the location of a tracking target possession is selectively output via a user-selected one of a tag provided in the corresponding possession and the terminal held by a possessor depending on whether the possession is classified as valuable according to the intention of the possessor among the possessions possessed by the possessor.

Moreover, the present invention provides the effect of allowing the detection distance between the location tracking terminal and a tag provided in a tracking target possession to be adjusted when the terminal is selected as a device which provides guidance on the location of the tracking target possession.

What is claimed is:

1. A terminal for tracking a location of an article set by an individual, the terminal comprising a possession location tracking terminal (100), the possession location tracking terminal (100) comprising:

an information input unit (110) to which information required for a selection of an identifier (ID) of one of possession tags (200) provided in possessions possessed by a possessor and a request for tracking of a location of a possession tag (200) provided in a corresponding possession having the tag ID is input;

an information output unit (120) which has a liquid crystal display (121) on which the information required for the selection of the ID of one of the possession tags (200) provided in the possessions possessed by the possessor is displayed;

an information storage unit (130) in which per-tag ID information which is IDs of the possession tags (200) provided in the possessions possessed by the possessor is stored;

an information communication unit (140) which performs a communication interface function of transmitting the information required for the request for the tracking of the location of the tracking target possession tag of the possession tags (200) provided in the possessions possessed by the possessor; and a control unit (150) which performs control such that the information required for the selection of the ID of one of possession tags (200) provided in the possessions possessed by the possessor and the request for the tracking of the location of the possession tag (200) provided in the corresponding possession having the tag ID is input, output, and transmitted;

wherein a main body guidance mode in which when the designated one of the possession tags (200) of the possessions possessed by the possessor is detected through the tracking of the location of the designated possession tag (200), the possession location tracking terminal (100) outputs information about detection of the designated possession tag (200) is provided as a mode in which an operation method of the control unit (150) is set;

wherein the information storage unit (130) stores per-received signal strength distance information which is indicative of distances from the possession location tracking terminal (100) having received per-tag ID signals from the possession tags (200) based on detected signal strengths of the received per-tag ID signals so that a distance between the possession tags (200) and the possession location tracking terminal (100) can be determined, and user-designated detection distance information which is information designated by a user and which is indicative of a set distance over which the possession location tracking terminal (100) can detect the possession tag (200) during the tracking of the location; and wherein the control unit (150), when receiving a per-tag ID signal from one of the possession tags (200) in the main body guidance mode, becomes aware of the corresponding possession tag (200) by reference to the received corresponding per-tag ID signal, detects a signal strength of the received per-tag ID signal, determines a detection distance between the possession location tracking terminal (100) and the possession tag (200) by matching the detected signal strength of the per-tag ID signal against the per-received signal strength distance information stored in the information storage unit (130), and, when the detection distance corresponds to the user-designated detection distance information stored in the information storage unit (130), performs a function of performing control such that the information about the detection of the designated possession tag (200) is output via the information output unit (120).

2. The terminal of claim 1, wherein:

a tag guidance mode in which when the designated one of the possession tags (200) of the possessions possessed by the possessor is detected through the tracking of the location of the designated possession tag (200), the designated possession tag (200) provides guidance on its own location is provided as a mode in which an operation method of the control unit (150) is set; and the control unit (150), when detecting the designated one of the possession tags (200) of the possessions possessed by the possessor in the tag guidance mode through the tracking of the location of the designated possession tag (200), performs control such that a tag output signal requesting the designated possession tag (200) to provide guidance on its own location is generated.

3. The terminal of claim 1, wherein the information input unit (110) comprises: tag ID selection buttons (111) which select an ID from among the IDs of the possession tags (200) of the possessions possessed by the possessor; and a location tracking request button (112) which requests the tracking of the location of the possession tag (200) provided in the corresponding possession having the selected tag ID.

4. The terminal of claim 3, wherein:

the possession location tracking terminal (100) comprises a stationary body (101) on which a circuit substrate, on which the information storage unit (130), the information communication unit (140), and the control unit (150) are mounted, is disposed, and an extension-type movable member (102) which slides into the stationary body (101); and a main body guidance mode request button (103) which is electrically connected to the circuit substrate and requests setting of the main body guidance mode is disposed at an end of the stationary body (101).

5. A location tracking system using a terminal for tracking a location of an article set by an individual, the location tracking system comprising:

possession tags (200) which are provided in respective possessions possessed by a possessor and transmit per-tag ID signals including tag ID information used to identify the corresponding tags; and a possession location tracking terminal (100) which, when per-tag ID signals are received from the possession tags (200), checks whether a per-tag ID signal of a tracking target tag of the possession tags (200) provided in the possessions possessed by the possessor is present and provides guidance such that information about detection of the tracking target possession tag (200) is output when the per-tag ID signal of the tracking target tag is present;

wherein the possession location tracking terminal (100) comprises: an information input unit (110) to which information required for a selection of an identifier (ID) of one of possession tags (200) provided in possessions possessed by a possessor and a request for tracking of a location of a possession tag (200) provided in a corresponding possession having the tag ID is input; an information output unit (120) which has a liquid crystal display (121) on which the information required for the selection of the ID of one of the possession tags (200) provided in the possessions possessed by the possessor is displayed; an information storage unit (130) in which per-tag ID information which is IDs of the possession tags (200) provided in the possessions possessed by the possessor is stored; an information communication unit (140) which performs a communication interface function of transmitting the information required for the request for the tracking of the location of the tracking target possession tag of the possession tags (200) provided in the possessions possessed by the possessor; and a control unit (150) which performs control such that the information required for the selection of the ID of one of possession tags (200) provided in the possessions possessed by the possessor and the request for the tracking of the location of the possession tag (200) provided in the corresponding possession having the tag ID is input, output, and transmitted and also performs control such that when per-tag ID signals re received from the possession tags (200), whether the per-tag ID signal of the tracking target possession tag of the possession tags (200) provided in possessions possessed by the possessor is present is checked and information about detection of the tracking target possession tag (200) is output when the per-tag ID signal of the tracking target possession tag (200) is present;

wherein the information storage unit (130) stores per-received signal strength distance information which is indicative of distances from the possession location tracking terminal (100) having received per-tag ID signals from the possession tags (200) based on detected signal strengths of the received per-tag ID signals so that a distance between the possession tags (200) and the possession location tracking terminal (100) can be determined, and user-designated detection distance information which is information designated by a user and which is indicative of a set distance over which the possession location tracking terminal (100) can detect the possession tag (200) during the tracking of the location; and wherein the control unit (150), when receiving a per-tag ID signal from one of the possession tags (200) in the main body guidance mode, becomes aware of the corresponding possession tag (200) by reference to the received corresponding per-tag ID signal, detects a signal strength of the received per-tag ID signal, determines a detection distance between the possession location tracking terminal (100) and the possession tag (200) by matching the detected signal strength of the per-tag ID signal against the per-received signal strength distance information stored in the information storage unit (130), and, when the detection distance corresponds to the user-designated detection distance information stored in the information storage unit (130), performs a function of performing control such that the information about the detection of the designated possession tag (200) is output via the information output unit (120).

6. The location tracking system of claim 5, wherein the information input unit (110) comprises: tag ID selection buttons (111) which select an ID from among the IDs of the possession tags (200) of the possessions possessed by the possessor; and a location tracking request button (112) which requests the tracking of the location of the possession tag (200) provided in the corresponding possession having the selected tag ID.

7. The location tracking system of claim 6, wherein:
the possession location tracking terminal (100) comprises a stationary body (101) on which a circuit substrate, on which the information storage unit (130), the information communication unit (140), and the control unit (150) are mounted, is disposed, and an extension-type movable member (102) which slides into the stationary body (101); and
a main body guidance mode request button (103) which is electrically connected to the circuit substrate and requests setting of the main body guidance mode is disposed at an end of the stationary body (101).

8. The location tracking system of claim 5, further comprising:
a user terminal (300) equipped with a possession location tracking app (301) which controls the possession location tracking terminal (100) so that one of the IDs of the possession tags (200) provided in the possessions possessed by the possessor is selected and the tracking of the location of the possession tag (200) provided in the corresponding possession having the tag ID is requested.

9. The location tracking system of claim 8, further comprising:
a per-tag possession detection guidance screen (400) which is a screen which is output to a display unit (310) of the user terminal (300) and which comprises tag ID columns (410) into which the tag IDs used to identify the possession tags (200) are entered and possession name columns (420) into which names of the corresponding possessions provided with the possession tags having corresponding tag IDs are entered.

10. A location tracking method using a terminal for tracking a location of an article set by an individual, the location tracking method comprising:
registering possession tags (200) provided in possessions possessed by a possessor in a possession location tracking terminal (100) (step S300);
becoming aware of, by the possession location tracking terminal (100), a tracking target possession tag of the possession tags (200) provided in the possessions possessed by the possessor (step S320);
transmitting, by the possession tags (200), per-tag ID signals, including tag ID information used to identify the corresponding tags (step S330);
determining, by the possession location tracking terminal (100), which of a tag guidance mode and a main body guidance mode is a set mode (step S340);
when the set mode is a tag guidance mode, controlling, by the possession location tracking terminal (100), the control unit (150) so that the control unit (150) checks whether the per-tag ID signal of the tracking target possession tag of the possession tags (200) provided in the possessions possessed by the possessor is present when per-tag ID signals are received from the possession tags (200) (step S350);
when the per-tag ID signal of the tracking target tag of the possession tags (200) provided in the possessions possessed by the possessor is present in the tag guidance mode, generating and transmitting, by the control unit (150) of the possession location tracking terminal (100), a tag output signal, including the tag ID information of the corresponding possession tag (200), as a signal requesting the corresponding possession tag (200) to provide guidance on a location (step S360);
receiving, by the tracking target possession tag (200), the tag output signal, and performing, by the tracking target possession tag (200), control such that information providing guidance on a location is output when the tag ID information included in the transmitted tag output signal is a same as its own tag ID information (step S370);
when the set mode is a main body guidance mode in determining which of a tag guidance mode and a main body guidance mode is the set mode (step S340), controlling, by the possession location tracking terminal (100), the control unit (150) so that the control unit (150) checks whether the per-tag ID signal of the tracking target possession tag of the possession tags (200) provided in the possessions possessed by the possessor is present when per-tag ID signals are received from the possession tags (200) (step S380); and when the per-tag ID signal of the tracking target possession tag of the possession tags (200) provided in the possessions possessed by the possessor is present in the main body guidance mode, performing, by the control unit (150) of the possession location tracking terminal (100), control such that information about the detection of the tracking target possession tag (200) is output (step S390);

wherein when the per-tag ID signal of the tracking target possession tag of the possession tags (200) provided in the possessions possessed by the possessor is present in the main body guidance mode, performing, by the control unit (150) of the possession location tracking terminal (100), control such that information about the detection of the tracking target possession tag (200) is output (step S390) comprises: becoming aware of, by the control unit (150) of the possession location tracking terminal (100), a corresponding possession tag (200) by reference to the received corresponding per-tag ID signal when a per-tag ID signal is received from one of the possession tags (200) in the main body guidance mode (step S391); detecting, by the control unit (150) of the possession location tracking terminal (100), a signal strength of the received per-tag ID signal in the main body guidance mode (step S392); determining, by the control unit (150) of the possession location tracking terminal (100), a detection distance between the possession location tracking terminal (100) and the tracking target possession tag (200) by matching the detected signal strength of the per-tag ID signal against preset per-received signal strength distance information in the main body guidance mode (step S393); checking, by the control unit (150) of the possession location tracking terminal (100), whether the determined detection distance corresponds to predetermined user-designated detection distance information in the main body guidance mode (step S394); and, when the determined detection distance corresponds to the predetermined user-designated detection distance information in the main body guidance mode, performing, by the control unit (150) of the possession location tracking terminal (100), control such that information about the detection of the tracking target possession tag (200) is output (step S395).

11. The location tracking method of claim 10, further comprising:
setting, by the possession location tracking terminal (100), information about links of the possessions of the possessor for the respective registered possession tags (200) (step S310).

12. The location tracking method of claim 11, wherein a user terminal (300) of the possessor which controls operation of the possession location tracking terminal (100) performs control such that the information about the links of the possessions of the possessor is set for the respective registered possession tags (200).

13. The location tracking method of claim 10, wherein checking, by the control unit (150) of the possession location tracking terminal (100), whether the determined detection distance corresponds to predetermined user-designated detection distance information in the main body guidance mode (step S394) comprises, when the determined detection distance does not correspond to the predetermined user-designated detection distance information in the main body guidance mode, performing, by the control unit (150) of the possession location tracking terminal (100), control such that information about the detection of the tracking target possession tag (200) is prevented from being output (step S396).

* * * * *